US012249279B2

(12) United States Patent
Shang et al.

(10) Patent No.: US 12,249,279 B2
(45) Date of Patent: Mar. 11, 2025

(54) DISPLAY SUBSTRATE, DRIVING METHOD THEREOF, AND DISPLAY APPARATUS

(71) Applicant: BOE Technology Group Co., Ltd., Beijing (CN)

(72) Inventors: Guangliang Shang, Beijing (CN); Jiangnan Lu, Beijing (CN); Li Wang, Beijing (CN); Mengyang Wen, Beijing (CN); Xing Yao, Beijing (CN); Libin Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/027,376

(22) PCT Filed: May 12, 2022

(86) PCT No.: PCT/CN2022/092379
§ 371 (c)(1),
(2) Date: Mar. 21, 2023

(87) PCT Pub. No.: WO2023/216175
PCT Pub. Date: Nov. 16, 2023

(65) Prior Publication Data

US 2024/0321197 A1 Sep. 26, 2024

(51) Int. Cl.

| | |
|---|---|
| ***G09G 3/3233*** | (2016.01) |
| ***G09G 3/3266*** | (2016.01) |
| ***G09G 3/3275*** | (2016.01) |

(52) U.S. Cl.
CPC ......... *G09G 3/3233* (2013.01); *G09G 3/3266* (2013.01); *G09G 3/3275* (2013.01);
(Continued)

(58) Field of Classification Search
CPC .. G09G 3/3233; G09G 3/3266; G09G 3/3275; G09G 2310/08; G09G 2320/0247; G09G 2330/021
See application file for complete search history.

(56) References Cited

U.S. PATENT DOCUMENTS

2008/0143700 A1* 6/2008 Shin ...................... G09G 3/344 345/208
2012/0229443 A1* 9/2012 Liu ......................... G09G 5/18 345/212
(Continued)

FOREIGN PATENT DOCUMENTS

CN 109272931 B 6/2020
CN 111968574 A 11/2020
(Continued)

*Primary Examiner* — Sejoon Ahn
(74) *Attorney, Agent, or Firm* — Ling Wu; Stephen Wang; Ling and Yang Intellectual Property

(57) ABSTRACT

Provided is a display substrate, a drive method thereof and a display apparatus, the display substrate includes: a first drive mode and a second drive mode, the first drive mode has a refresh rate less than that of the second drive mode, wherein the contents displayed on the display substrate include a plurality of display frames, in the first drive mode, the display frames include: a refresh frame and at least one maintain frame; the display substrate includes pixel circuits arranged in an array, the pixel circuits include a data signal line and a first initial signal line; the data signal line provides a first data signal in the maintain frame, the voltage value of the first data signal is constant, and/or the first initial signal line provides a first initial signal in the refresh frame and the maintain frame, the first initial signal is an AC signal.

19 Claims, 11 Drawing Sheets

(52) U.S. Cl.
CPC . *G09G 2310/08* (2013.01); *G09G 2320/0247* (2013.01); *G09G 2330/021* (2013.01)

(56) References Cited

U.S. PATENT DOCUMENTS

| | | | | |
|---|---|---|---|---|
| 2014/0015820 | A1* | 1/2014 | Choi | G09G 3/3614 345/204 |
| 2015/0116195 | A1* | 4/2015 | Yokonuma | G09G 3/3406 345/102 |
| 2016/0027393 | A1* | 1/2016 | Yoshiga | G09G 3/3648 345/94 |
| 2017/0046998 | A1* | 2/2017 | Zhang | G09G 3/20 |
| 2017/0053587 | A1* | 2/2017 | Kim | G09G 3/2092 |
| 2017/0053603 | A1* | 2/2017 | Hirakata | G06F 3/03547 |
| 2019/0051250 | A1 | 2/2019 | Lee | |
| 2020/0043394 | A1* | 2/2020 | Bai | G09G 3/20 |
| 2020/0320947 | A1* | 10/2020 | Shi | G11C 19/28 |
| 2021/0110771 | A1 | 4/2021 | Lee et al. | |
| 2021/0287614 | A1 | 9/2021 | Xiong et al. | |
| 2021/0343238 | A1* | 11/2021 | Okabe | G09G 3/3275 |
| 2021/0375198 | A1* | 12/2021 | Zhang | G09G 3/325 |
| 2021/0375213 | A1* | 12/2021 | Gao | G09G 3/3233 |

FOREIGN PATENT DOCUMENTS

| | | | |
|---|---|---|---|
| CN | 112735330 | A | 4/2021 |
| CN | 113012643 | A | 6/2021 |
| CN | 113889030 | A | 1/2022 |
| CN | 113892132 | A | 1/2022 |
| CN | 113903307 | A | 1/2022 |
| CN | 113990244 | A | 1/2022 |
| CN | 113990259 | A | 1/2022 |
| CN | 114038429 | A | 2/2022 |
| CN | 114424280 | A | 4/2022 |
| GB | 2615936 | A | 8/2023 |
| IN | 113906495 | A | 1/2022 |

* cited by examiner

DISPLAY SUBSTRATE, DRIVING METHOD THEREOF, AND DISPLAY APPARATUS

CROSS-REFERENCE TO RELATED APPLICATION

The present application is a U.S. National Phase Entry of International Application No. PCT/CN2022/092379 having an international filing date of May 12, 2022. The above-identified application is hereby incorporated by reference.

TECHNICAL FIELD

The present disclosure relates to, but is not limited to, the field of display technology, and particularly relates to a display substrate and a drive method thereof, and a display apparatus.

BACKGROUND

An Organic Light Emitting Diode (OLED for short) and a Quantum-dot Light Emitting Diode (QLED for short) are active light emitting display apparatuses and have advantages such as self-light emitting, wide viewing angle, high contrast ratio, low power consumption, very high response speed, lightness and thinness, flexibility, and low costs. With the continuous development of display technologies, flexible displays that use OLEDs or QLEDs as light emitting elements and control signals by thin film transistors (TFTs) have become mainstream products in the field of display at present.

SUMMARY

The following is a summary of subject matters described herein in detail. The summary is not intended to limit the protection scope of claims.

In a first aspect, the present disclosure provides a display substrate, drive modes of the display substrate includes: a first drive mode and a second drive mode, the first drive mode has a refresh rate less than that of the second drive mode, wherein the contents displayed on the display substrate include a plurality of display frames, wherein in the first drive mode, the display frames include: a refresh frame and at least one maintain frame; the display substrate includes pixel circuits arranged in an array, wherein the pixel circuit includes a data signal line and a first initial signal line;

the data signal line provides a first data signal in the maintain frame, the voltage value of the first data signal is constant, and/or the first initial signal line provides a first initial signal in the refresh frame and the maintain frame, wherein the first initial signal is an AC signal.

In some possible implementations, the data signal line provides a second data signal during a partial time period of the refresh frame;

the voltage value of the first data signal is greater than or equal to the voltage value of the second data signal.

In some possible implementations, the first initial signal includes: a first sub-initial signal and a second sub-initial signal; the first initial signal line provides the first sub-initial signal in the refresh frame and provides the second sub-initial signal in the maintain frame;

an average voltage value of the second sub-initial signal is greater than an average voltage value of the first sub-initial signal.

In some possible implementations, the pixel circuit further includes: a second initial signal line;

the second initial signal line provides a second initial signal to the second reset transistor in the refresh frame and the maintain frame, wherein the second initial signal is a DC signal and the voltage value of the second initial signal is constant.

In some possible implementations, the pixel circuit further includes: a reset signal line, a first scan signal line and a light emitting signal line;

the refresh frame includes an initialization stage, a data write stage and a refresh light emitting stage; the refresh light emitting stage includes a plurality of first stages and a plurality of second stages, the first stage and the second stage are alternate, and the first first stage is before the first second stage;

the signal of the reset signal line is a valid level signal in the initialization stage and an invalid level signal in the data write stage and the first stage;

the signal of the first scan signal line is a valid level signal in the data write stage and an invalid level signal in the initialization stage and the first stage;

the light emitting signal line is an invalid level signal in the initialization stage, the data write stage and the second stage, and is a valid level signal in the first stage;

wherein, the valid level signal is a level signal that causes the transistor to be turned on, the invalid level signal is a level signal that causes the transistor to be turned off, the duration of the first stage is equal to the duration of the light emitting signal line being a valid level signal, and the duration of the second stage is equal to the duration of the signal of the light emitting signal line being an invalid level signal.

In some possible implementations, the maintain frame includes: a plurality of third stages and a plurality of fourth stages, the third stage and the fourth stage are alternate, the signal of the light emitting signal line in the last stage of the refresh light emitting stage and the signal in the first stage of the maintain frame are mutually inverse signals;

the signal of the second scan signal line is an invalid level signal in the third stage and the fourth stage;

the signal of the light emitting signal line is an invalid level signal in the third stage and is a valid level signal in the fourth stage;

the first scan signal line and the reset signal line are low-level signals in the fourth stage;

the duration of the third stage is equal to the duration when the signal of the light emitting signal line is an invalid level signal, and the duration of the fourth stage is equal to the duration when the light emitting signal line is a valid level signal.

In some possible implementations, a first third stage includes a first maintain sub-stage and a second maintain sub-stage, wherein the first maintain sub-stage occurs before the second maintain sub-stage, and the sum of the durations of the first maintain sub-stage and the second maintain sub-stage is less than the duration of the signal of the light emitting signal line being an invalid level signal;

the signal of the reset signal line is a valid level signal in the first maintain sub-stage and an invalid level signal in a first time period, wherein the first time period is a time period other than the first maintain sub-stage in the first third stage;

the signal of the first scan signal line is a valid level signal in the second maintain sub-stage and an invalid level signal in a second time period, wherein the second time period is a time period other than the second maintain sub-stage in the first third stage.

In some possible implementations, the pixel circuit further includes a second scan signal line;

the second scan signal line is a valid level signal at the initialization stage and the data write stage, and is an invalid level signal at the first stage and the second stage;

the signal of the second scan signal line is an invalid level signal in the third stage and the fourth stage;

the duration for which the signal of the second scan signal line is a valid level signal is smaller than the duration for which the signal of the light emitting signal line is an invalid level signal.

In some possible implementations, the duration for which the signal of the reset signal line is a valid level signal is smaller than the duration for which the second scan signal line is a valid level signal;

the duration for which the signal of the first scan signal line is a valid level signal is less than the duration for which the signal of the second scan signal line is a valid level signal;

the duration for which the signal of the reset signal line is a valid level signal is less than or equal to the duration for which the signal of the first scan signal line is a valid level signal.

In some possible implementations, the signals of the reset signal line and the first scan signal line are invalid level signals at the second stage.

In some possible implementations, the signals of the reset signal line and the first scan signal line are invalid level signals from the second third stage to the Nth third stage, N is greater than or equal to 2, N=M/K, where M is the reference frequency of the display substrate, K is the refresh rate of the display substrate in the first drive mode, and the reference frequency is the refresh rate of the display substrate in the second drive mode or the preset refresh rate.

In some possible implementations, the second stage includes a first refresh sub-stage;

the signal of the first scan signal line is an invalid level signal in the second stage;

the signal of the reset signal line is a valid level signal in the first refresh sub-stage and an invalid level signal in a third time period, wherein the third time period is a time period other than the first refresh sub-stage in the second stage.

In some possible implementations, any third stage of the second third stage to the Nth third stage includes a third maintain sub-stage;

the signal of the first scan signal line is an invalid level signal from the second third stage to the Nth third stage;

the reset signal line is a valid level signal at a third maintain sub-stage in any third stage from the second third stage to the Nth third stage, and is an invalid level signal in a fourth time period, which is a time period other than the third maintain sub-stage in any third stage from the second third stage to the Nth third stage.

In some possible implementations, a frequency at which the signal of the reset signal line is a valid level signal is equal to a frequency at which the signal of the light emitting signal line is an invalid level signal.

In some possible implementations, the second stage includes a second refresh sub-stage;

the signal of the reset signal line is an invalid level signal in the second stage;

the signal of the first scan signal line is a valid level signal in the second refresh sub-stage and an invalid level signal in a fifth time period, wherein the fifth time period is a time period other than the second refresh sub-stage in the second stage.

In some possible implementations, any third stage of the second third stage to the Nth third stage includes a fourth maintain sub-stage;

the signal of the reset signal line is an invalid level signal from the second third stage to the Nth third stage;

the first scan signal line is a valid level signal at the fourth maintain sub-stage in any third stage from the second third stage to the Nth third stage, and is an invalid level signal in a sixth time period, wherein the sixth tie period is a time period other than a fourth maintain sub-stage in any third stage from the second third stage to the Nth third stage.

In some possible implementations, a frequency at which the signal of the first scan signal line is a valid level signal is equal to a frequency at which the signal of the light emitting signal line is an invalid level signal.

In some possible implementations, the second stage includes a first refresh sub-stage and a third refresh sub-stage, the sum of the durations of the first refresh sub-stage and the third refresh sub-stage is less than the duration of the second stage;

the signal of the reset signal line is a valid level signal in the first refresh sub-stage and an invalid level signal in a third time period, wherein the third time period is a time period other than the first refresh sub-stage in the second stage;

the signal of the first scan signal line is a valid level signal in the third refresh sub-stage and an invalid level signal in a seventh time period, wherein the seventh time period is a time period other than the second refresh sub-stage in the second stage.

In some possible implementations, any third stage of the second third stage to the Nth third stage includes a third maintain sub-stage and a fifth maintain sub-stage, the sum of the durations of the third maintain sub-stage and the fifth maintain sub-stage is less than the duration of the third stage;

the reset signal line is a valid level signal at a third maintain sub-stage of the second third stage to the Nth third stage, and is an invalid level signal in a fourth time period, wherein the fourth time period is a time period other than a third maintain sub-stage in any third stage from the second third stage to the Nth third stage;

the first scan signal line is a valid level signal at a fifth maintain sub-stage of any third stage from the second third stage to the Nth third stage, and is an invalid level signal in an eighth time period, wherein the eighth time period is a time period other than the fifth refresh sub-stage of any third stage from the second third stage to the Nth third stage.

In some possible implementations, a frequency at which the signal of the reset signal line is a valid level signal and a frequency at which the signal of the first scan signal line is a valid level signal are both equal to a frequency at which the signal of the light emitting signal line is an invalid level signal.

In some possible implementations, the display substrate further includes a light emitting element, the light emitting element includes an anode, and the pixel circuit further includes a write transistor, an anode reset transistor, a node reset transistor, a compensation reset transistor, a compensation transistor, a first light emitting control transistor, a second light emitting control sub-transistor, a drive transistor, a capacitor, and a first power supply line, wherein the capacitor includes a first electrode plate and a second electrode plate;

the data signal line is electrically connected to a first electrode of the write transistor, the first initial signal line is electrically connected to a first electrode of the anode reset transistor, the second initial signal line is electrically connected to a first electrode of the node reset transistor, the reset signal line is electrically connected to the control electrodes of the anode reset transistor and the node reset transistor, the first scan signal line is electrically connected to control electrodes of the compensation transistor and the write transistor, the second scan signal line is electrically connected to a control electrode of the compensation reset transistor, and the light emitting signal line is respectively electrically connected to the control electrodes of the first light emitting control transistor and the second light emitting control transistor; a second electrode of the node reset transistor is electrically connected to a second electrode of the compensation reset transistor and a first electrode of the compensation transistor, a control electrode of the drive transistor is electrically connected to a first electrode plate of the capacitor and a first electrode of the compensation reset transistor, a first electrode of the drive transistor is electrically connected to a second electrode of the write transistor and a second electrode of the first light emitting control transistor, a second electrode of the drive transistor is electrically connected to a second electrode of the compensation transistor and a first electrode of the second light emitting control transistor, a first electrode of the first light emitting control transistor is respectively electrically connected to the first power supply line and a second electrode plate of the capacitor, and a second electrode of the second light emitting control transistor is electrically connected to a second electrode of the anode reset transistor and an anode of the light emitting element;

the transistor type of the compensation reset transistor is opposite to the transistor types of the compensation transistor, the drive transistor, the first light emitting control transistor, the second light emitting control transistor, the node reset transistor, the write transistor and the anode reset transistor.

In some possible implementations, the display substrate further includes a light emitting element, the light emitting element includes: an anode, the pixel circuit further includes a write transistor, an anode reset transistor, a first node reset transistor, a second node reset transistor, a compensation transistor, a first light emitting control transistor, a second light emitting control sub-transistor, a drive transistor, a capacitor, and a third initial signal line, the capacitor includes a first electrode plate and a second electrode plate;

the data signal line is electrically connected to a first electrode of the write transistor, the first initial signal line is electrically connected to a first electrode of the anode reset transistor, the second initial signal line is electrically connected to a first electrode of the first node reset transistor, the third initial signal line is electrically connected to a first electrode of the second node reset transistor, the reset signal line is electrically connected to a control electrode of the anode reset transistor, a control electrode of the first node reset transistor and a control electrode of the second node reset transistor, the first scan signal line is electrically connected to a control electrode of the write transistor, and the light emitting signal line is electrically connected to the control electrodes of the first light emitting control transistor and the second light emitting control transistor, respectively; a second electrode of the first node reset transistor is electrically connected to a first electrode plate of the capacitor and a first electrode of the compensation transistor, a control electrode of the drive transistor is electrically connected to a first electrode plate of the capacitor, a first electrode of the drive transistor is electrically connected to a second electrode of the write transistor, a second electrode of the first light emitting control transistor and a second electrode of the second node reset transistor, a second electrode of the drive transistor is electrically connected to a second electrode of the compensation transistor and a first electrode of the second light emitting control transistor, a first electrode of the first light emitting control transistor is respectively electrically connected to the first power supply line and a second electrode plate of the capacitor, and a second electrode of the second light emitting control transistor is electrically connected to a second electrode of the anode reset transistor and an anode of the light emitting element;

the transistor type of the compensation transistor is opposite to the transistor types of the drive transistor, the first light emitting control transistor, the second light emitting control transistor, the first node reset transistor, the second node reset transistor, the write transistor and the anode reset transistor.

In a second aspect, the present disclosure further provides a display apparatus, including the display substrate described above.

In a third aspect, the present disclosure further provides a method for driving a display substrate, which is configured to drive the above-mentioned display substrate, and the method includes:

in a maintain frame, a data signal line provides a first data signal having a constant voltage value, and/or in a refresh frame and a maintain frame, a first initial signal line provides a first initial signal, which is an AC signal.

Other aspects may be understood upon reading and understanding the drawings and the detailed description.

BRIEF DESCRIPTION OF DRAWINGS

Accompanying drawings are used for providing further understanding of technical solutions of the present disclosure, constitute a part of the specification, and together with the embodiments of the present disclosure, are used for explaining the technical solutions of the present disclosure but not to constitute limitations on the technical solutions of the present disclosure. Shapes and sizes of various components in the drawings do not reflect actual scales, but are only intended to schematically illustrate contents of the present disclosure.

DETAILED DESCRIPTION

Figure 1:
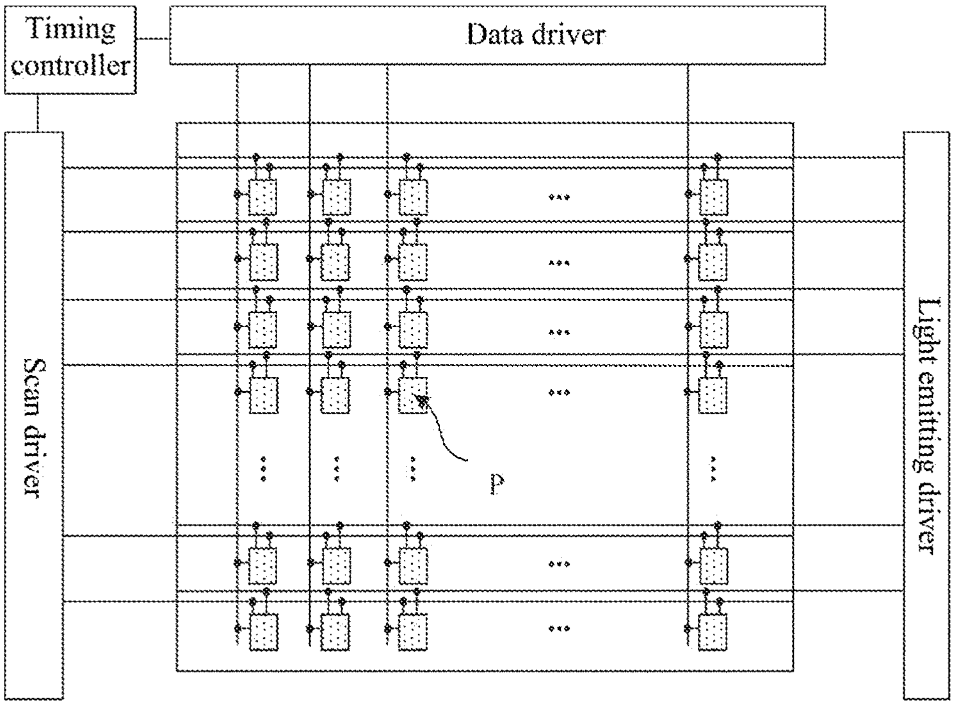
FIG. 1 is a schematic diagram of a structure of a display substrate.

To make objectives, technical solutions, and advantages of the present disclosure clearer, the embodiments of the present disclosure will be described in detail with reference to the accompanying drawings. It is to be noted that implementation modes may be implemented in a plurality of different forms. Those of ordinary skills in the art may easily understand such a fact that implementations and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other if there is no conflict. In order to keep following description of the embodiments of the present disclosure clear and concise, detailed descriptions about part of known functions and known components are omitted in the present disclosure. The drawings of the embodiments of the present disclosure only involve structures involved in the embodiments of the present disclosure, and other structures may refer to usual designs.

In the drawings, a size of each constituent element, a thickness of a layer, or a region is exaggerated sometimes for clarity. Therefore, one implementation mode of the present disclosure is not necessarily limited to the sizes, and shapes and sizes of various components in the drawings do not reflect actual scales. In addition, the drawings schematically illustrate ideal examples, and one implementation of the present disclosure is not limited to the shapes, numerical values, or the like shown in the drawings.

Ordinal numerals such as “first”, “second”, and “third” in the specification are set to avoid confusion of constituent elements, but not to set a limit in quantity.

In the specification, for convenience, wordings indicating orientation or positional relationships, such as “middle”, “upper”, “lower”, “front”, “back”, “vertical”, “horizontal”, “top”, “bottom”, “inside”, and “outside”, are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions for describing the various constituent elements. Therefore, appropriate replacements may be made according to situations without being limited to the wordings described in the specification.

In the specification, unless otherwise specified and defined explicitly, terms “mount”, “mutually connect”, and “connect” should be understood in a broad sense. For example, the connection may be a fixed connection, a detachable connection or an integrated connection. It may be a mechanical connection or an electrical connection. It may be a direct mutual connection, or an indirect connection through middleware, or internal communication between two components. Those of ordinary skill in the art may understand specific meanings of these terms in the present disclosure according to specific situations.

In the specification, a transistor refers to a component which includes at least three terminals, i.e., a gate electrode, a drain electrode and a source electrode. The transistor has a channel region between the drain electrode (drain electrode terminal, drain region, or drain) and the source electrode (source electrode terminal, source region, or source), and a current may flow through the drain electrode, the channel region, and the source electrode. It is to be noted that, in the specification, the channel region refers to a region through which the current mainly flows.

In the specification, a first electrode may be a drain electrode, and a second electrode may be a source electrode. Or, the first electrode may be the source electrode, and the second electrode may be the drain electrode. In cases that transistors with opposite polarities are used, a current direction changes during operation of a circuit, or the like, functions of the “source electrode” and the “drain electrode” are sometimes interchangeable. Therefore, the “source electrode” and the “drain electrode” are interchangeable in the specification.

In the specification, “electrical connection” includes a case that constituent elements are connected together through an element with a certain electrical effect. The “element with the certain electrical effect” is not particularly limited as long as electrical signals may be sent and received between the connected constituent elements. Examples of the “element with the certain electrical effect” not only include electrodes and wirings, but also include switch elements such as transistors, resistors, inductors, capacitors, other elements with various functions, etc.

In the specification, “parallel” refers to a state in which an angle formed by two straight lines is above −10° and below 10°, and thus also includes a state in which the angle is above −5° and below 5°. In addition, “perpendicular” refers to a state in which an angle formed by two straight lines is above 80° and below 100°, and thus also includes a state in which the angle is above 85° and below 95°.

In the specification, a “film” and a “layer” are interchangeable. For example, a “conductive layer” may be replaced with a “conductive film” sometimes. Similarly, an “insulation film” may be replaced with an “insulation layer” sometimes.

In the present disclosure, “about” refers to that a boundary is defined not so strictly and numerical values within process and measurement error ranges are allowed.

Low Temperature Poly-Silicon (LTPS for short) technology is used in a display substrate. The LTPS technology has advantages such as high resolution, a high response speed, high brightness, and a high aperture ratio. Although it is welcomed by the market, the LTPS technology also has some defects, such as a relatively high production cost and relatively large power consumption. At this time, a technology solution of Low Temperature Polycrystalline Oxide (LTPO for short) came into being. Compared with the LTPS technology, in the LTPO technology a leakage current is smaller, pixel point response is faster, and an additional layer of oxide is added to a display substrate, which reduces energy consumption required for exciting pixel points, thus reducing power consumption during displaying of a screen. However, compared with the display products using LTPS technology, the display products using LTPO technology will appear flicker when displaying at low frequency, which reduces the display effect of the display products.

The display substrate according to the embodiment of the present disclosure includes a first drive mode and a second drive mode, wherein the refresh rate of the first drive mode is smaller than the refresh rate of the second drive mode, for example, the refresh rate of the first drive mode may be 1HZ-60HZ, and the refresh rate of the second drive mode may be 60HZ-480HZ. The contents displayed on the display substrate include a plurality of display frames. In the first drive mode, the display frames include a refresh frame and at least one maintain frame. In the second driving mode, the display frame only includes: a refresh frame.

Figure 2:
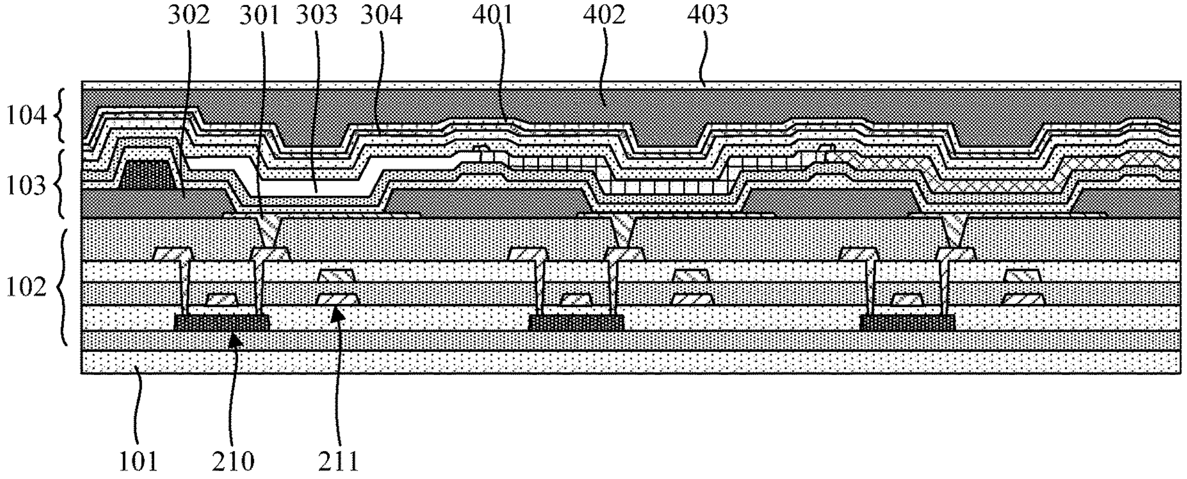
FIG. 2 is a schematic diagram of a sectional structure of a display substrate.
Figure 3A:
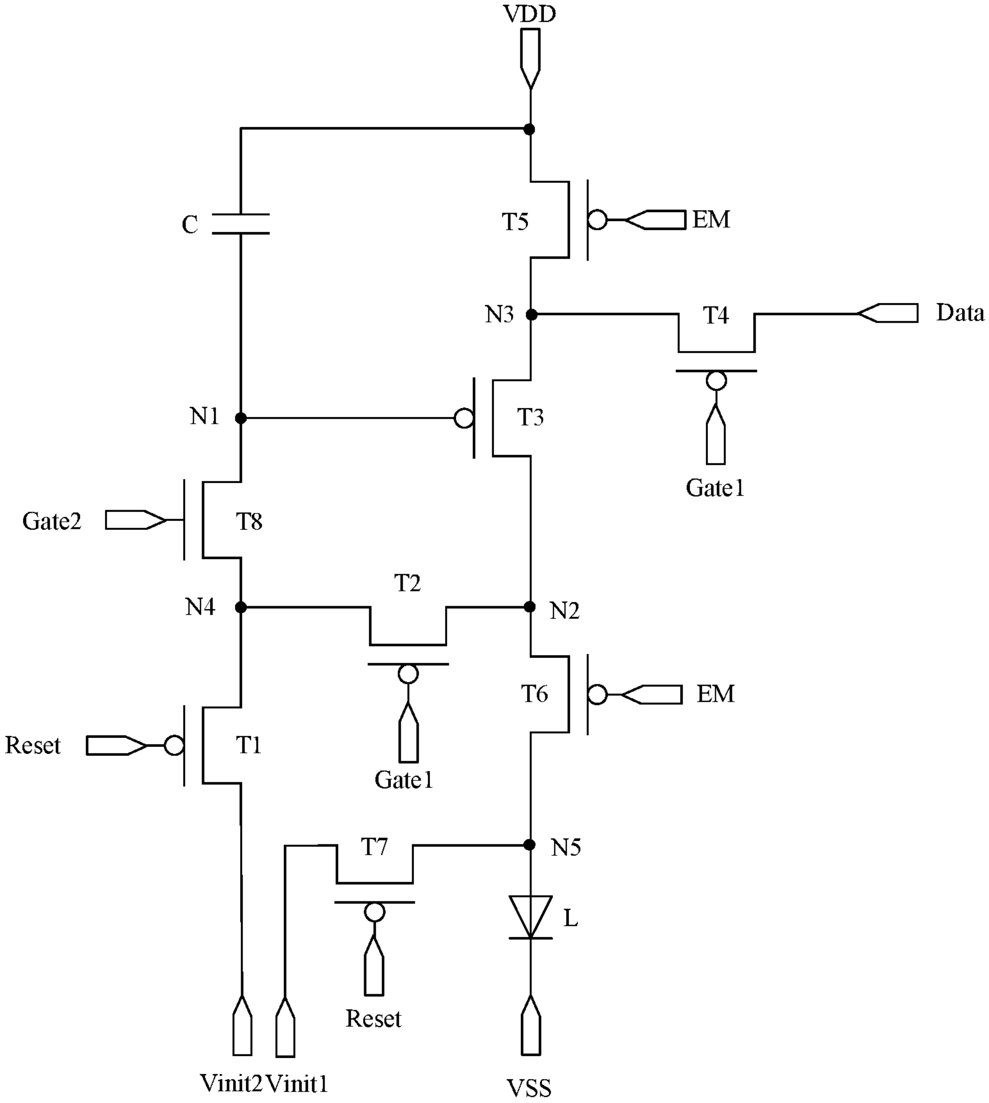
FIG. 3A is an equivalent circuit diagram of a pixel circuit.
Figure 3B:
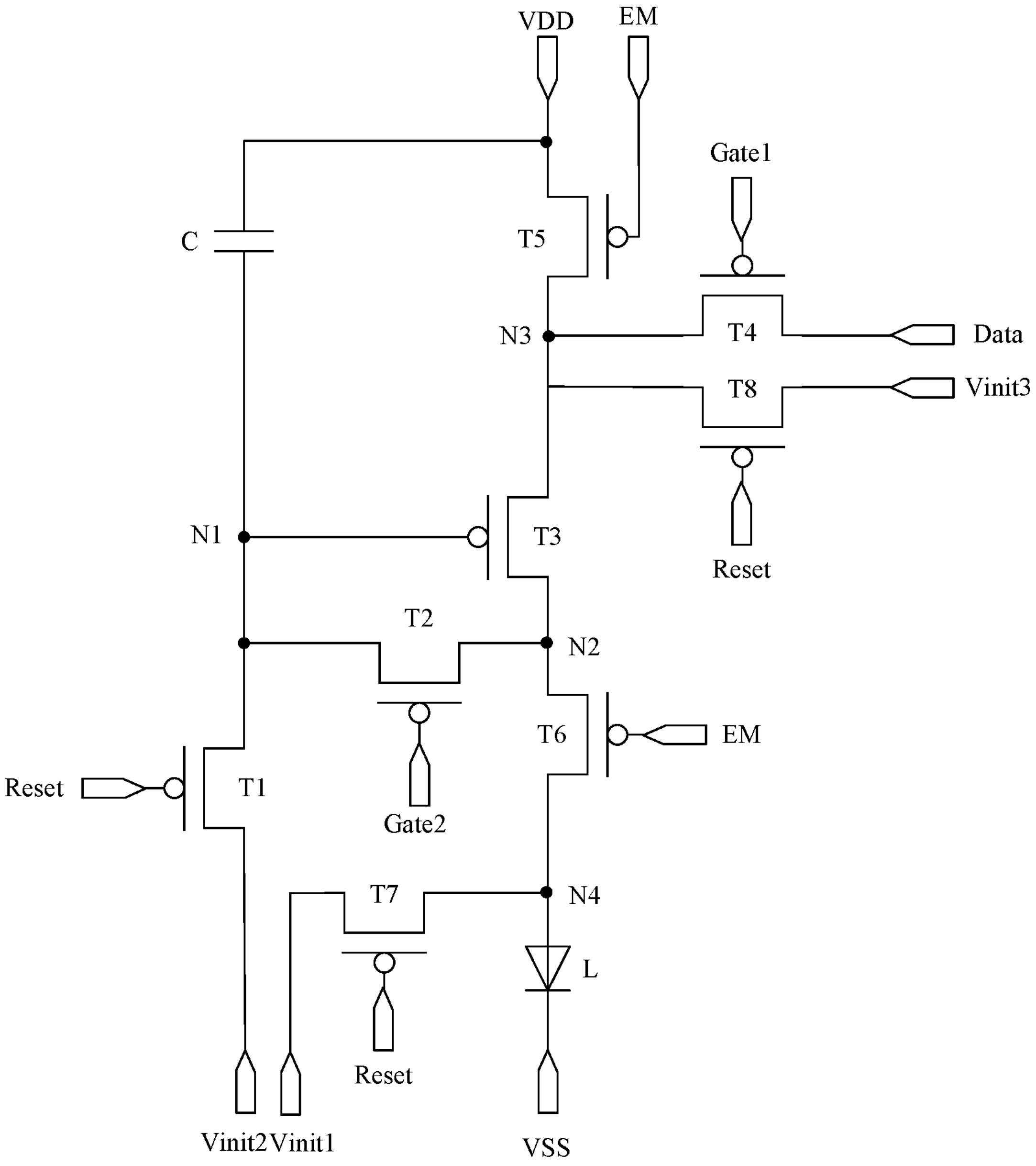
FIG. 3B is another equivalent circuit diagram of a pixel circuit.
Figure 4:
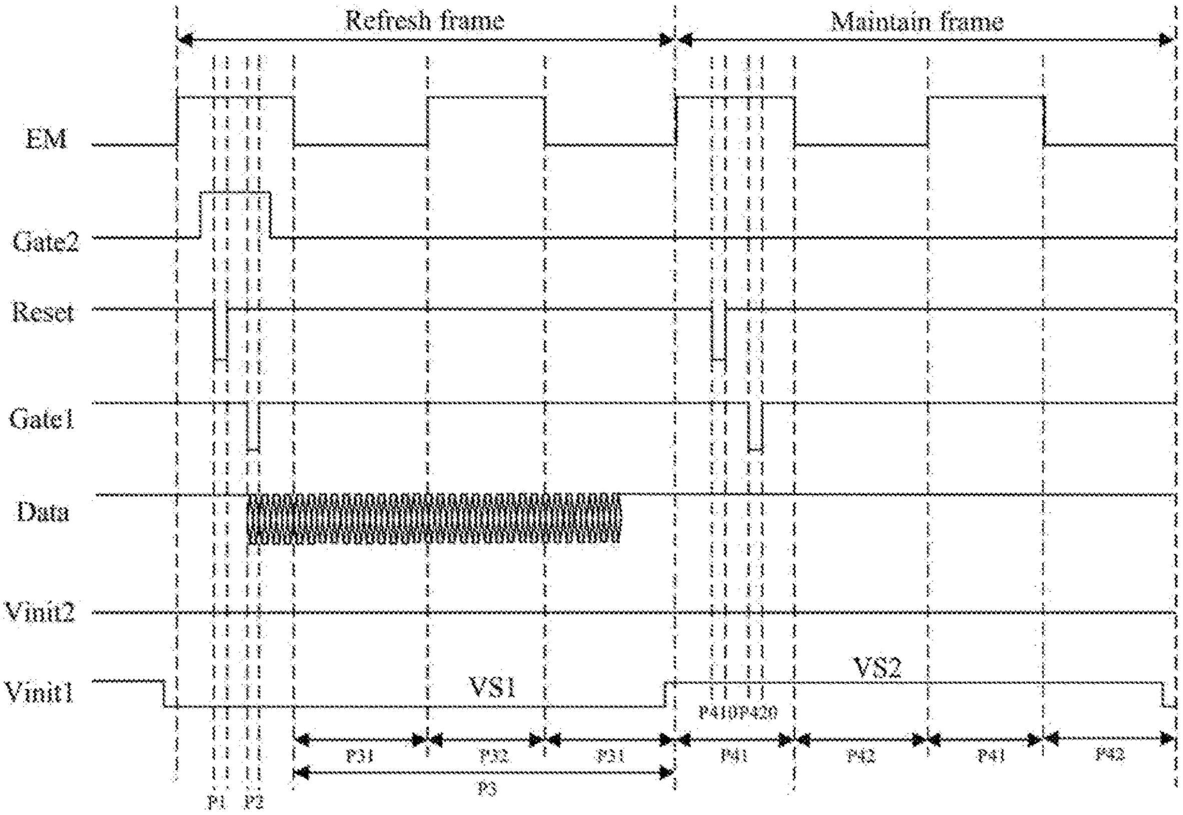
FIG. 4 is a first working timing diagram of the pixel circuit provided in FIG. 3A.
Figure 5:
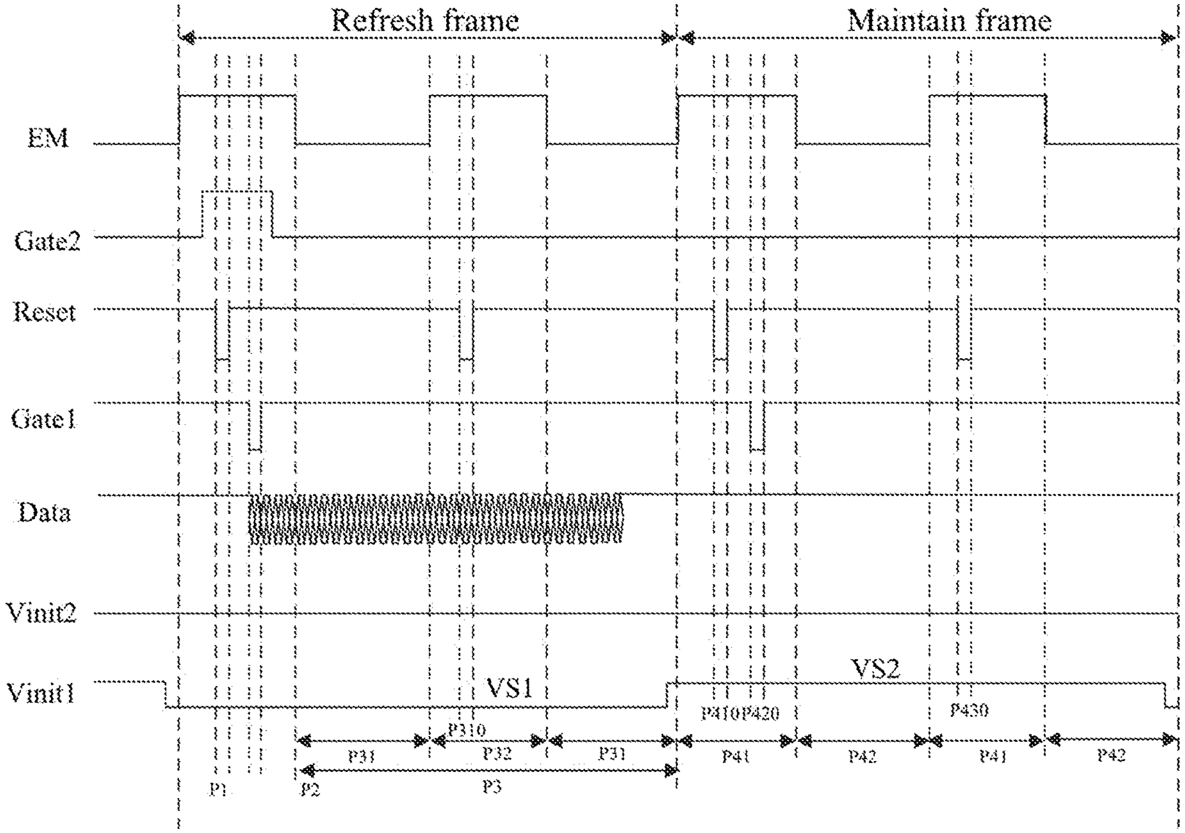
FIG. 5 is a second working timing diagram of the pixel circuit provided in FIG. 3A.
Figure 6:
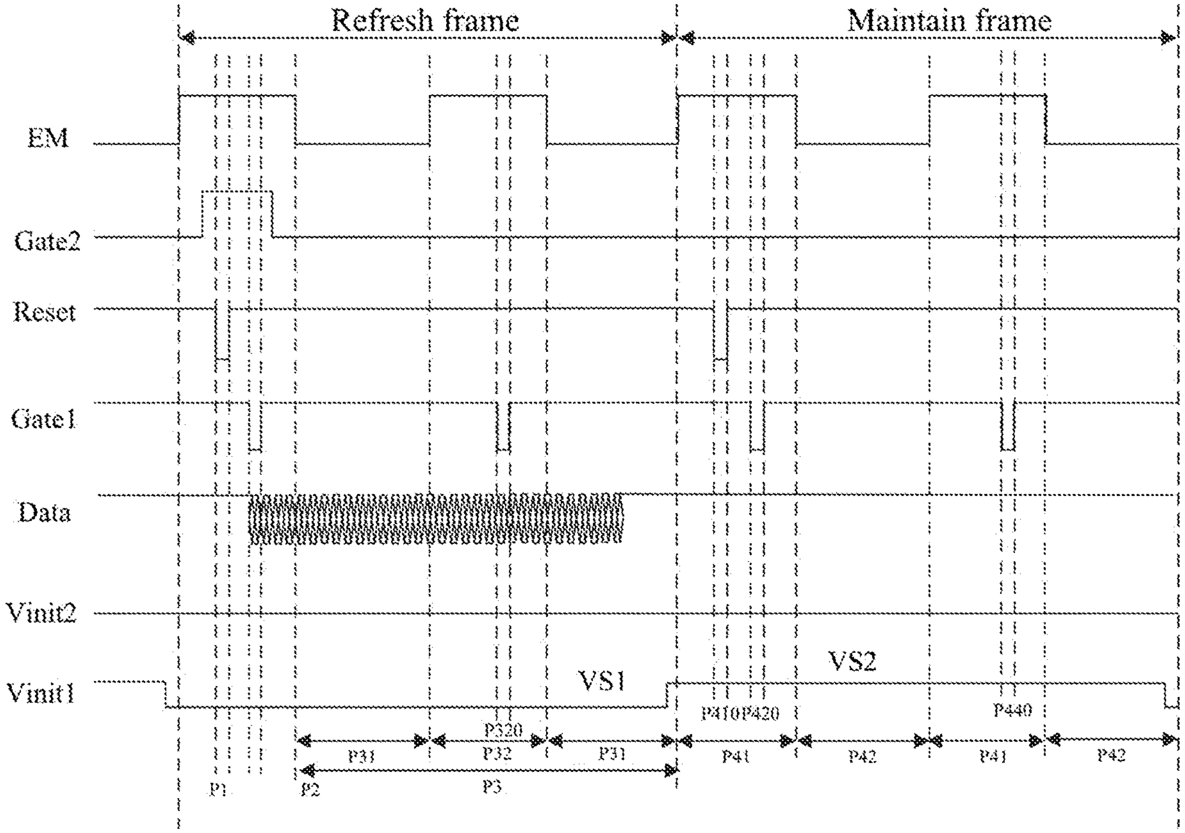
FIG. 6 is a third working timing diagram of the pixel circuit provided in FIG. 3A.
Figure 7:
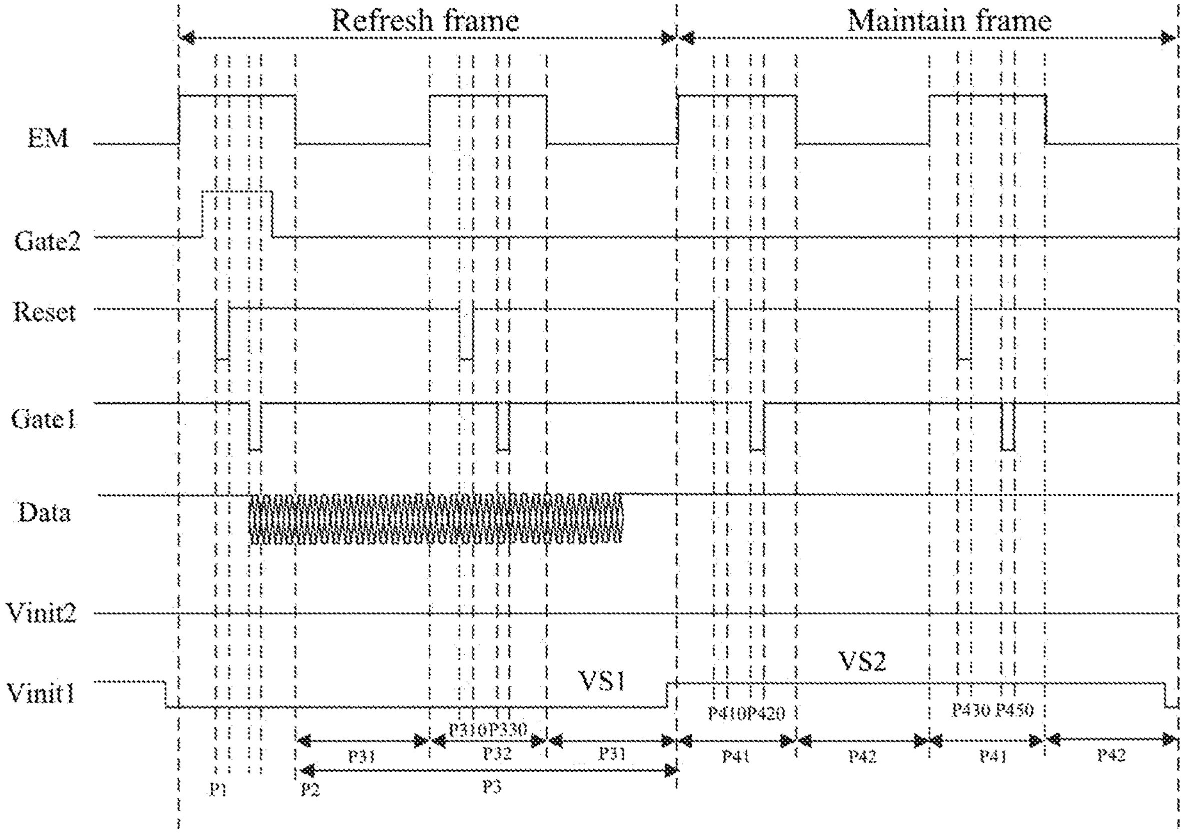
FIG. 7 is a fourth working timing diagram of the pixel circuit provided in FIG. 3A.
Figure 8:
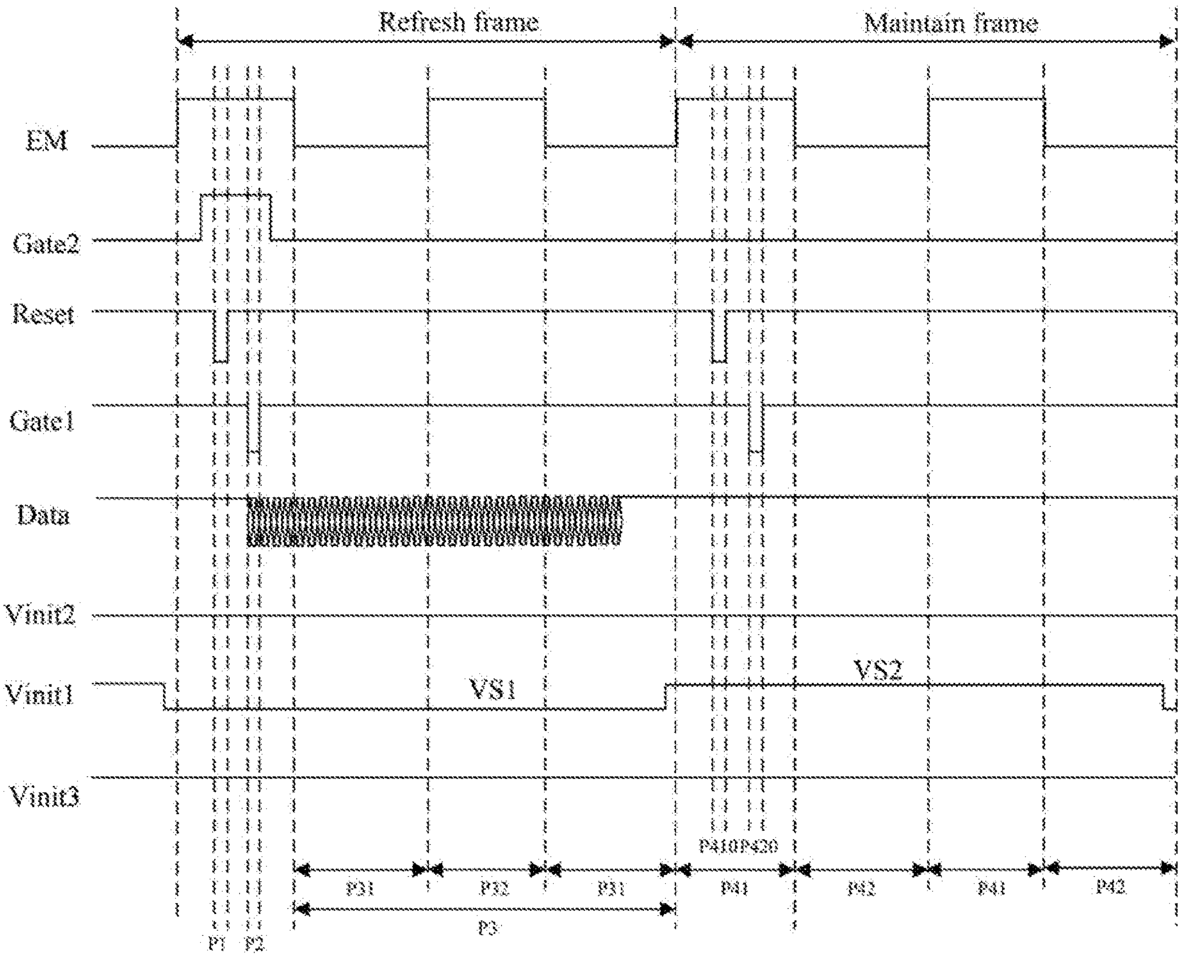
FIG. 8 is a first working timing diagram of the pixel circuit provided in FIG. 3B.
Figure 9:
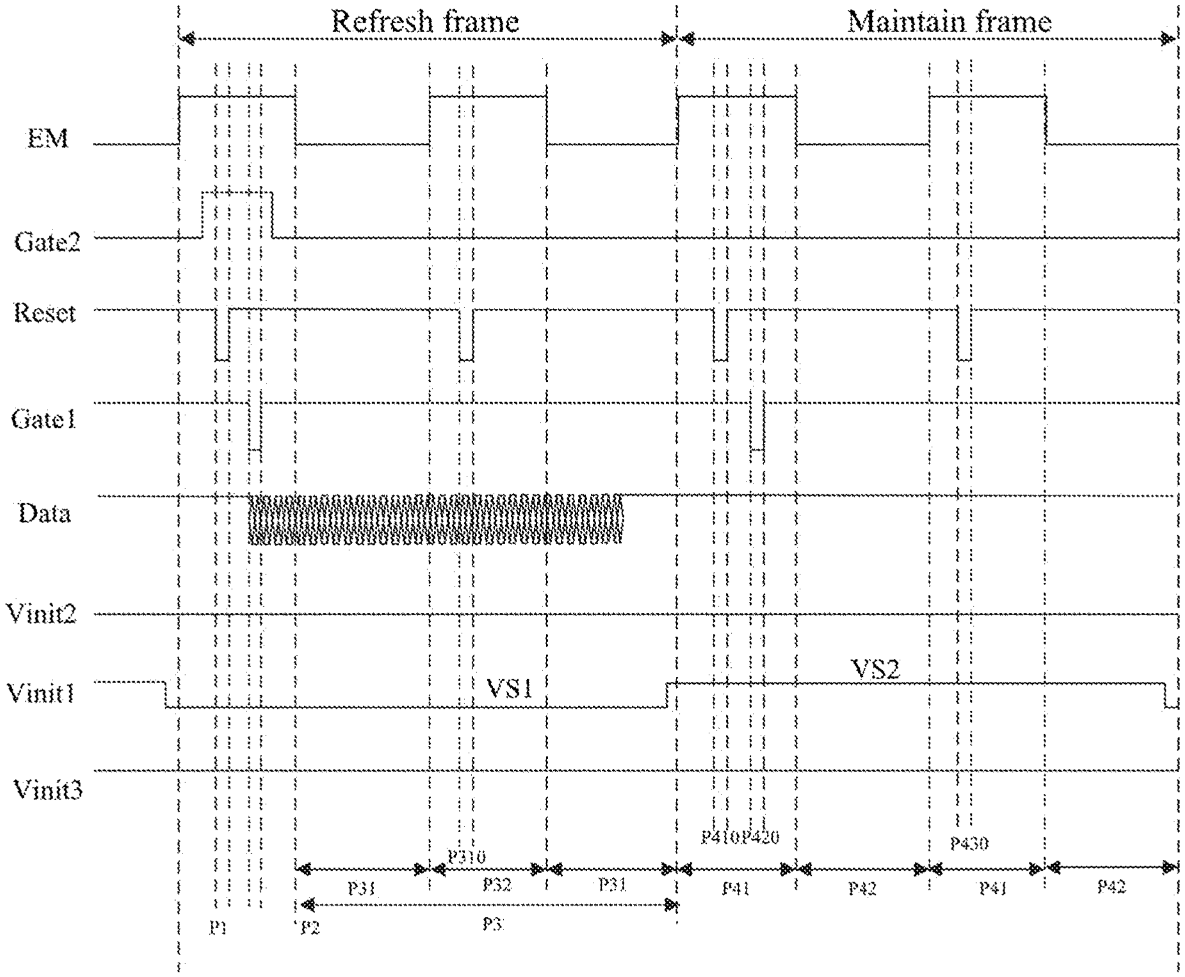
FIG. 9 is a second working timing diagram of the pixel circuit provided in FIG. 3B.
Figure 10:
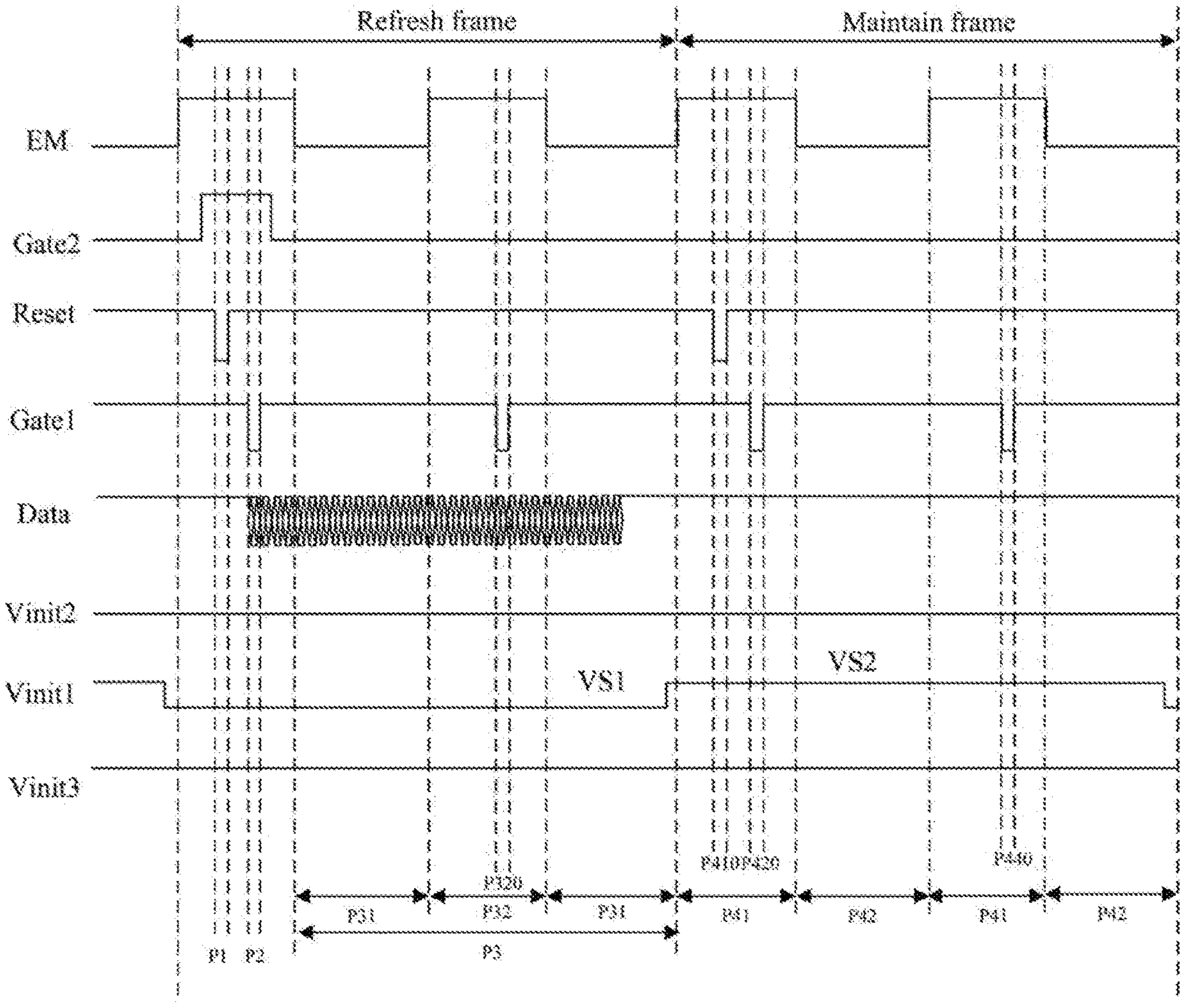
FIG. 10 is a third working timing diagram of the pixel circuit provided in FIG. 3B.
Figure 11:
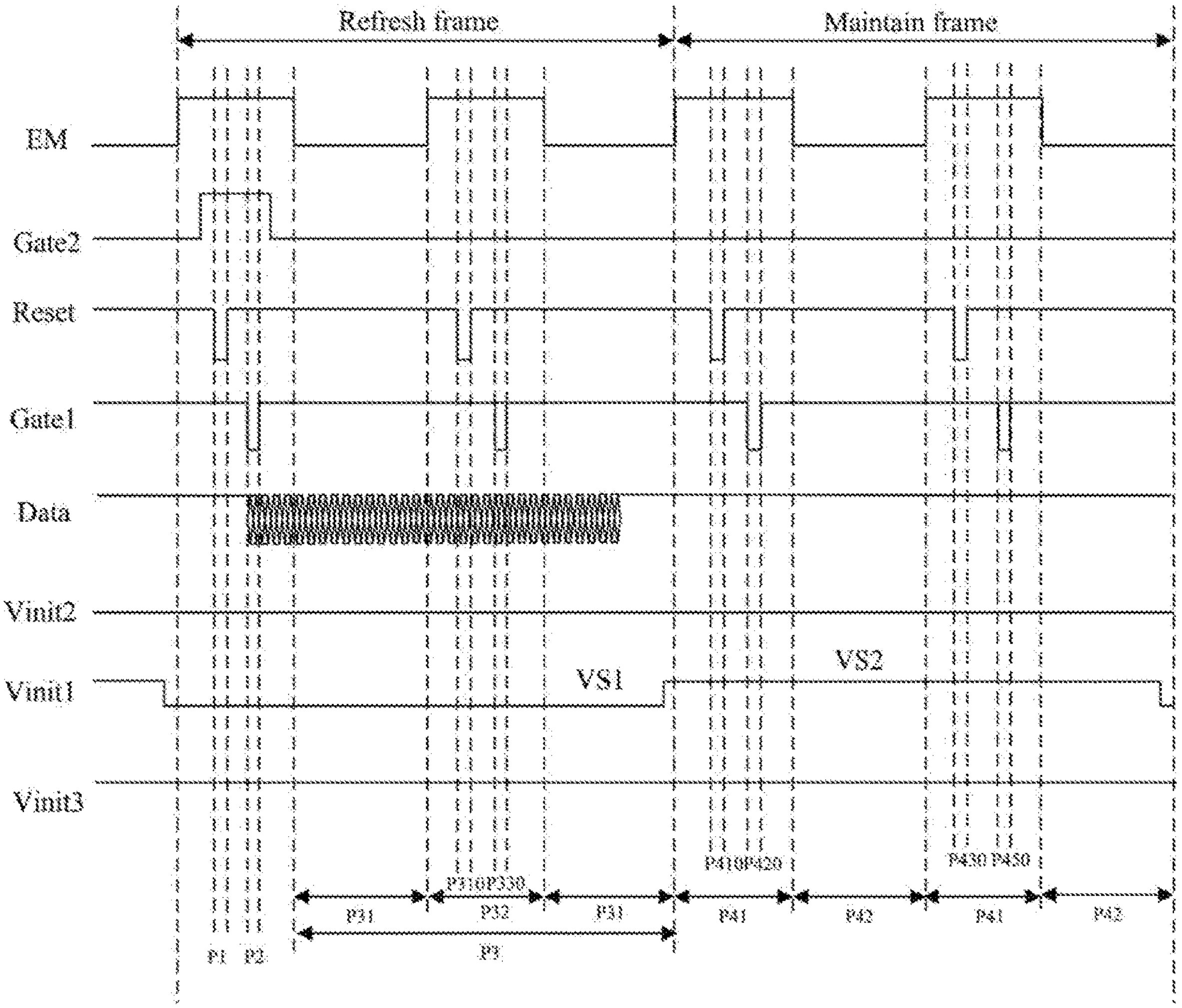
FIG. 11 is a fourth working timing diagram of the pixel circuit provided in FIG. 3B.

FIG. 1 is a schematic diagram of a structure of a display substrate, FIG. 2 is a schematic diagram of a sectional structure of a display substrate, FIG. 3A is an equivalent circuit diagram of a pixel circuit, FIG. 3B is another equivalent circuit diagram of a pixel circuit, FIG. 4 is a first working timing diagram of the pixel circuit provided in FIG. 3A, FIG. 5 is a second working timing diagram of the pixel circuit provided in FIG. 3A, FIG. 6 is a third working timing diagram of the pixel circuit provided in FIG. 3A, FIG. 7 is a fourth working timing diagram of the pixel circuit provided in FIG. 3A, FIG. 8 is a first working timing diagram of the pixel circuit provided in FIG. 3B, FIG. 9 is a second working timing diagram of the pixel circuit provided in FIG. 3B, FIG. 10 is a third working timing diagram of the pixel circuit provided in FIG. 3B, and FIG. 11 is a fourth working timing diagram of the pixel circuit provided in FIG. 3B. As shown in FIGS. 1 to 11, the display substrate may include: a pixel circuit P arranged in an array, the pixel circuit includes: a write transistor, an anode reset transistor, a data signal line Data extending in a first direction, and a first initial signal line Vinit1 extending in a second direction; the data signal line Data is electrically connected to a first electrode of the write transistor, the first initial signal line Vinit1 is electrically connected to a first electrode of the anode reset transistor, and the first direction intersects the second direction.

In the present disclosure, as shown in FIGS. 4 to 7, the data signal line Data provides a first data signal in the maintain frame, the voltage value of the first data signal is constant, and/or the first initial signal line Vinit1 provides a first initial signal in the refresh frame and the maintain frame, wherein the first initial signal is an Alternating Current (AC) signal. Wherein, the rising edge or falling edge of the first initial signal occurs in the time period where the refresh frame is located.

In an exemplary embodiment, the Direct Current (DC) signal may be a signal whose magnitude and direction do not vary with time. For example, the first data signal is a DC signal, and its voltage value is constant. In an exemplary embodiment, the AC signal may be a signal in which one of the magnitude and direction of the signal varies with time; or, both the magnitude and direction of the signal vary with time. For example, the first initial signal is an AC signal, that is, the voltage value of the first initial signal is different in the refresh frame and the maintain frame. Exemplarily, the first initial signal is an AC signal, the voltage of the first initial signal is 2V at a refresh frame, and the voltage of the first initial signal is 5V at a maintain frame. Or, the first initial signal is an AC signal, the voltage of the first initial signal is −2V at a refresh frame voltage, and the voltage of the first initial signal is 5V at a maintain frame.

In some exemplary embodiments, the display substrate includes: a base substrate and a circuit structure layer and a light emitting structure layer sequentially stacked on the base substrate, as shown in FIG. 2, on a plane perpendicular to the display substrate, the display substrate may include a base substrate 101, a circuit structure layer 102 disposed on the base substrate 101, a light emitting structure layer 103 disposed on a side of the circuit structure layer 102 away from the base substrate 101, and the encapsulation structure layer 104 disposed on a side of the light emitting structure layer 103 away from the base substrate 101. The circuit structure layer includes a pixel circuit, the light emitting structure layer includes a light emitting element, and the pixel circuit is configured to drive the light emitting element to emit light.

In an exemplary embodiment, the display substrate may further include another film layer, such as a touch control structure layer, which is not limited in the present disclosure.

In an exemplary embodiment, the base substrate may be a rigid base substrate or a flexible base substrate, wherein the rigid base substrate may be, but is not limited to, one or more of glass and metal foil, the flexible base substrate may be, but is not limited to, one or more of polyethylene glycol terephthalate, ethylene terephthalate, polyether ether ketone, polystyrene, polycarbonate, polyarylate, polyarylester, polyimide, polyvinyl chloride, polyethylene, and textile fibers.

In an exemplary embodiment, the circuit structure layer 102 may include a plurality of transistors and capacitors forming a pixel circuit. FIG. 2 only takes one transistor 210 and one capacitor 211 in the pixel circuit as an example.

In an exemplary embodiment, the circuit structure layer may further include: a second power supply line, the second power supply line is electrically connected to a cathode of the light emitting element, and an anode of the light emitting element is electrically connected to the pixel circuit.

In an exemplary embodiment, the light emitting element may be an Organic Light Emitting Diode (OLED) or a Quantum dot Light Emitting Diode (QLED). The OLED may include a stacked first electrode (anode), an organic light emitting layer, and a second electrode (cathode), which are stacked. The anode is located on a side of the organic emitting layer close to the base substrate and the cathode is located on a side of the organic emitting layer away from the base substrate.

In an exemplary embodiment, as shown in FIG. 2, the light emitting structure layer 103 may include an anode 301, a pixel define layer 302, an organic light emitting layer 303 and a cathode 304. The anode 301 is connected to a drain electrode of the transistor 210 in the pixel circuit by a via hole. The organic light emitting layer 303 is connected to the anode 301, the cathode 304 is connected to the organic light emitting layer 303, and the organic light emitting layer 303 emits light of a corresponding color under the drive of the anode 301 and the cathode 304. The encapsulation structure layer 104 may include a first encapsulation layer 401, a second encapsulation layer 402, and a third encapsulation layer 403 which are stacked, wherein the first encapsulation layer 401 and the third encapsulation layer 403 may be made of an inorganic material, the second encapsulation layer 402 may be made of an organic material, and the second encapsulation layer 402 is disposed between the first encapsulation layer 401 and the third encapsulation layer 403, thus ensuring that external water vapor cannot enter the light emitting structure layer 103.

In an exemplary embodiment, the organic emitting layer may include a Hole Injection Layer (HIL for short), a Hole Transport Layer (HTL for short), an Electron Block Layer (EBL for short), an Emitting Layer (EML for short), a Hole Block Layer (HBL for short), an Electron Transport Layer (ETL for short), and an Electron Injection Layer (EIL for short) that are stacked. In an exemplary embodiment, hole injection layers of all sub pixels may be connected together to form a common layer, electron injection layers of all the sub pixels may be connected together to form a common layer, hole transport layers of all the sub pixels may be connected together to form a common layer, electron transport layers of all the sub pixels may be connected together to form a common layer, hole block layers of all the sub pixels may be connected together to form a common layer, emitting layers of adjacent sub pixels may be overlapped slightly, or may be isolated from each other, and electron block layers of adjacent sub pixels may be overlapped slightly, or may be isolated from each other.

In an exemplary embodiment, as shown in FIG. 3A, the pixel circuit may include 8 transistors (a first transistor T1 to an eighth transistor T8), 1 capacitor C and 8 signal lines (a data signal line Data, a first scan signal line Gate1, a second scan signal line Gate2, a reset signal line Reset, a light emitting signal line EM, a first initial signal line Vinit1, a second initial signal line Vinit2 and a first power supply line VDD).

In an exemplary embodiment, a first electrode plate of the capacitor C is electrically connected to a first node N1, and a second plate of the capacitor C is electrically connected to the first power supply line VDD. A control electrode of the first transistor T1 is electrically connected to the reset signal line Reset, a first electrode of the first transistor T1 is electrically connected to the second initial signal line Vinit2, and a second electrode of the first transistor is electrically connected to a fourth node N4. A control electrode of the second transistor T2 is electrically connected to the first scan signal line Gate1, a first electrode of the second transistor T2 is electrically connected to the fourth node N4, and a second electrode of the second transistor T2 is electrically connected to a second node N2. A control electrode of the third transistor T3 is electrically connected to the first node N1, a first electrode of the third transistor T3 is electrically connected to a third node N3, and a second electrode of the third transistor T3 is electrically connected to the second node N2. A control electrode of the fourth transistor T4 is electrically connected to a first scan signal line Gate1, a first electrode of the fourth transistor T4 is electrically connected to a data signal line Data, and a second electrode of the fourth transistor T4 is electrically connected to the third node N3. A control electrode of the fifth transistor T5 is electrically connected to the light emitting signal line EM, a first electrode of the fifth transistor T5 is electrically connected to the first power supply line VDD, and a second electrode of the fifth transistor T5 is electrically connected to the third node N3. A control electrode of the sixth transistor T6 is electrically connected to the light emitting signal line EM, a first electrode of the sixth transistor T6 is electrically connected to the second node N2, and a second electrode of the sixth transistor T6 is electrically connected to a fifth node N5. A control electrode of the seventh transistor T7 is electrically connected to the reset signal line Reset, a first electrode of the seventh transistor T7 is electrically connected to the first initial signal line Vinit1, and a second electrode of the seventh transistor T7 is electrically connected to the fifth node N5. A control electrode of the eighth transistor T8 is electrically connected to the second scan signal line Gate2, a first electrode of the eighth transistor T8 is electrically connected to the first node N1, and a second electrode of the eighth transistor T8 is electrically connected to the fourth node N4.

In an exemplary embodiment, the anode of the light emitting element is electrically connected to the fifth node N5.

In an exemplary embodiment, the first transistor T1 may be referred to as a node reset transistor. When the reset signal line Reset provides an active level signal, the first transistor T1 transmits a second initial signal to the fourth node N4 to initialize the charge amount of the fourth node N4, wherein, the second initial signal is a signal provided by the second initial signal line Vinit2.

In an exemplary embodiment, the second transistor T2 may be referred to as a compensation transistor, when the first scan signal line Gate1 provides an active level signal, the second transistor T2 transmits the signal of the second node N2 to the fourth node N4, which can perform threshold compensation for the third transistor T3.

In an exemplary embodiment, the third transistor T3 may be referred to as a drive transistor, and the third transistor T3 determines the drive current flowing between the first power supply line VDD and the second power supply line VSS according to the potential difference between its control electrode and first electrode.

In an exemplary embodiment, the fourth transistor T4 may be referred to as a write transistor, and when the first scan signal line Gate1 inputs an active level signal, the fourth transistor T4 enables the data voltage of the data signal line Data to be input to the pixel circuit.

In an exemplary embodiment, the fifth transistor T5 may be referred to as a first light emitting control transistor, and the sixth transistor T6 may be referred to as a second light emitting control transistor. When an effective level signal is input to the light emitting signal line EM, the fifth transistor T5 and the sixth transistor T6 enable a light emitting element to emit light by forming a path of drive current between the first power supply line VDD and the second power supply line VSS.

In an exemplary embodiment, the seventh transistor T7 may be referred to as an anode reset transistor. When the reset signal line Reset provides an active level signal, the seventh transistor T7 transmits the first initial signal to an anode of the light emitting element to initialize the charge of the anode of the light emitting element.

In an exemplary embodiment, the eighth transistor T8 may be referred to as a compensation reset transistor, and when an effective level signal is input to the second scan signal line Gate2, the eighth transistor T8 transmits a signal of the fourth node N4 to the first node N1, not only a charge amount of the first node N1 may be initialized, but also threshold compensation may be performed on the third transistor T3.

In an exemplary embodiment, a signal of the first power supply line VDD is a high-level signal continuously provided, and a signal of the second power supply line VSS is a low-level signal.

In an exemplary embodiment, transistors may be divided into N-type transistors and P-type transistors according to their characteristics. When the transistor is a P-type transistor, the turn-on voltage is a low-level voltage (e.g. 0V, −5V, −10V or other suitable voltage) and the turn-off voltage is a high-level voltage (e.g. 5V, 10V or other suitable voltage). When the transistor is an N-type transistor, the turn-on voltage is a high-level voltage (e.g. 5V, 10V or other suitable voltage) and the turn-off voltage is a low-level voltage (e.g. 0V, −5V, −10V or other suitable voltage).

In an exemplary embodiment, the transistor type of the compensation reset transistor is opposite to the transistor type of the compensation transistor, the light emitting control transistor, the node reset transistor, the write transistor, and the anode reset transistor.

In an exemplary embodiment, the eighth transistor T8 may be a metal oxide transistor and is an N-type transistor, and the first transistor T1 to the seventh transistor T7 are low-temperature poly-silicon transistors and are P-type transistors.

In an exemplary embodiment, the eighth transistor T8 is an oxide transistor and may reduce a leakage current, improve performance of the pixel circuit, and may reduce power consumption of the pixel circuit.

In an exemplary embodiment, as shown in FIG. 3B, the pixel circuit may include 8 transistors (a first transistor T1 to an eighth transistor T8), 1 capacitor C and 8 signal lines (a data signal line Data, a first scan signal line Gate1, a second scan signal line Gate2, a reset signal line Reset, a light emitting signal line EM, a first initial signal line Vinit1, a second initial signal line Vinit2, a third initial signal line Vinit3, and a first power supply line VDD).

In an exemplary embodiment, a first electrode plate of the capacitor C is electrically connected to a first node N1, and a second plate of the capacitor C is electrically connected to the first power supply line VDD. A control electrode of the first transistor T1 is electrically connected to the reset signal line Reset, a first electrode of the first transistor T1 is electrically connected to the second initial signal line Vinit2, and a second electrode of the first transistor is electrically connected to a first node N1. A control electrode of the second transistor T2 is electrically connected to a second scan signal line Gate2, a first electrode of the second transistor T2 is electrically connected to a first node N1, and a second electrode of the second transistor T2 is electrically connected to the second node N2. A control electrode of the third transistor T3 is electrically connected to the first node N1, a first electrode of the third transistor T3 is electrically connected to a third node N3, and a second electrode of the third transistor T3 is electrically connected to the second node N2. A control electrode of the fourth transistor T4 is electrically connected to a first scan signal line Gate1, a first electrode of the fourth transistor T4 is electrically connected to a data signal line Data, and a second electrode of the fourth transistor T4 is electrically connected to the third node N3. A control electrode of the fifth transistor T5 is electrically connected to the light emitting signal line EM, a first electrode of the fifth transistor T5 is electrically connected to the first power supply line VDD, and a second electrode of the fifth transistor T5 is electrically connected to the third node N3. A control electrode of the sixth transistor T6 is electrically connected to the light emitting signal line EM, a first electrode of the sixth transistor T6 is electrically connected to the second node N2, and a second electrode of the sixth transistor T6 is electrically connected to a fourth node N4. A control electrode of the seventh transistor T7 is electrically connected to the reset signal line Reset, a first electrode of the seventh transistor T7 is electrically connected to the first initial signal line Vinit2, and a second electrode of the seventh transistor T7 is electrically connected to the fourth node N4. A control electrode of the eighth transistor T8 is electrically connected to the reset signal line Reset, a first electrode of the eighth transistor T8 is electrically connected to the third initial signal line Vinit3, and a second electrode of the eighth transistor T8 is electrically connected to the third node N3 or to the second node N2. FIG. 3B illustrates an example in which the second electrode of the eighth transistor T8 is electrically connected to the third node N3.

In an exemplary embodiment, an anode of the light emitting element is electrically connected to the fourth node N4.

In an exemplary embodiment, the first transistor T1 may be referred to as a first node reset transistor, when the reset signal line Reset provides an active level signal, the first transistor T1 transmits the second initial signal to the first node N1 to initialize the charge amount of the first node N1.

In an exemplary embodiment, the second transistor T2 may be referred to as a compensation transistor, when the first scan signal line Gate1 provides an active level signal, the second transistor T2 transmits the signal of the second node N2 to the fourth node N4, which can perform threshold compensation for the third transistor T3.

In an exemplary embodiment, the third transistor T3 may be referred to as a drive transistor, and the third transistor T3 determines the drive current flowing between the first power supply line VDD and the second power supply line VSS according to the potential difference between its control electrode and first electrode.

In an exemplary embodiment, the fourth transistor T4 may be referred to as a write transistor, and when the first scan signal line Gate1 inputs an active level signal, the fourth transistor T4 enables the data voltage of the data signal line Data to be input to the pixel circuit.

In an exemplary embodiment, the fifth transistor T5 may be referred to as a first light emitting control transistor, and the sixth transistor T6 may be referred to as a second light emitting control transistor. When an effective level signal is input to the light emitting signal line EM, the fifth transistor T5 and the sixth transistor T6 enable a light emitting element to emit light by forming a path of drive current between the first power supply line VDD and the second power supply line VSS.

In an exemplary embodiment, the seventh transistor T7 may be referred to as an anode reset transistor. When the reset signal line Reset provides an active level signal, the seventh transistor T7 transmits the initialization voltage to an anode of the light emitting element to initialize the charge of the anode of the light emitting element.

In an exemplary embodiment, the eighth transistor T8 may be referred to as a second node reset transistor, and when the reset signal line Reset provides an effective level signal, the eighth transistor T8 transmits a third initial signal to the third node N3 or the second node N2 to initialize the charge amount of the third node N3 or the second node N2, wherein the third initial signal is a signal provided by the third initial signal line Vinit3.

In an exemplary embodiment, a signal of the first power supply line VDD is a high-level signal continuously provided, and a signal of the second power supply line VSS is a low-level signal.

In an exemplary embodiment, transistors may be divided into N-type transistors and P-type transistors according to their characteristics. When the transistor is a P-type transistor, the turn-on voltage is a low-level voltage (e.g. 0V, −5V, −10V or other suitable voltage) and the turn-off voltage is a high-level voltage (e.g. 5V, 10V or other suitable voltage). When the transistor is an N-type transistor, the turn-on voltage is a high-level voltage (e.g. 5V, 10V or other suitable voltage) and the turn-off voltage is a low-level voltage (e.g. 0V, −5V, −10V or other suitable voltage).

In an exemplary embodiment, the transistor type of the second node reset transistor is opposite to the transistor type of the compensation transistor, the light emitting control transistor, the first node reset transistor, the write transistor, and the anode reset transistor.

In an exemplary embodiment, the second transistor T2 may be a metal oxide transistor, and is an N-type transistor, and the first transistor T1, the third transistor T3 to the eighth transistor T8 are low-temperature polysilicon transistors, and are P-type transistors.

In an exemplary embodiment, the second transistor T2 is an oxide transistor and may reduce a leakage current, improve performance of the pixel circuit, and may reduce power consumption of the pixel circuit.

In an exemplary embodiment, the period of maintain frame may be the same as the period of refresh frame, or it may be the same as a period of a sub-frame, wherein the period of the sub-frame is a minimum common period of both the period of the signal of the light emitting signal line EM and the period of the signal of the Reset signal line when the signal of the light emitting signal line EM includes a plurality of effective level signals and the signal of the reset signal line Reset includes a plurality of effective level signals within one frame.

In an exemplary embodiment, as shown in FIG. 1, the display substrate may include a timing controller, a data driver, a scan driver, a light emitting driver and a pixel array. The timing controller is connected to the data driver, the scan driver and the light emitting driver, respectively, the data driver is connected to a plurality of data signal lines respectively, the scan driver is connected to a plurality of scan signal lines respectively, and the light emitting driver is connected to a plurality of emitting signal lines respectively. The pixel array may include a plurality of sub-pixels P, at least one sub-pixel P may include a circuit unit and a light emitting element connected to the circuit unit, and the circuit unit may include a pixel circuit.

In an exemplary embodiment, a scan signal line includes a first scan signal line or a first scan line, and a scan driver includes a first scan driver connected to the first scan signal line and a second scan driver connected to the second scan signal line.

In an exemplary embodiment, the timing controller may provide a gray-scale value and a control signal, which are suitable for a specification of the data driver, to the data driver, provide a clock signal, a scan start signal, etc., which are suitable for a specification of the scan driver, to the scan driver, and provide a clock signal, a transmit stop signal, etc., which are suitable for a specification of the light emitting driver, to the light emitting driver.

In an exemplary embodiment, the data driver may generate a data voltage to be provided to the data signal lines using the gray-scale value and the control signal received from the timing controller. For example, the data driver may sample the gray-scale value using the clock signal, and apply the data voltage corresponding to the gray-scale value to the data signal line by taking a pixel row as a unit.

In an exemplary embodiment, the scan driver may generate scan signals to be provided to the scan signal lines by receiving the clock signal, the scan start signal, or the like, from the timing controller. For example, the scan driver may sequentially provide scan signals with on-level pulses to scan signal lines. For example, the scan driver may be constructed in a form of a shift register and may generate a scan signal by sequentially transmitting the scan start signal provided in a form of an on-level pulse to a next stage circuit under control of the clock signal.

In an exemplary embodiment, the light emitting driver may generate a emission signal to be provided to a light emitting signal line by receiving the clock signal, the light emitting stop signal, and the like from the timing controller. For example, the light emitting driver may provide an emission signal with an off-level pulse to the light emitting signal lines sequentially. For example, the light emitting driver may be constructed in a form of the shift register and generate an emission signal by sequentially transmitting emission stop signals provided in the form of the off-level pulse to the next-stage circuit under the control of the clock signal.

In an exemplary embodiment, the display substrate may include a plurality of pixel units arranged in a matrix; at least one of the plurality of pixel units includes a plurality of sub-pixels. The pixel circuit in the sub-pixels is connected to a scan signal line, a data signal line, and a light emitting signal line respectively. The pixel circuit is configured to receive a data voltage transmitted by the data signal line and output a corresponding current to the light emitting element under control of the scan signal line and the light emitting signal line. The light emitting elements of the sub-pixels are respectively connected to the pixel circuits of the sub-pixels where they are located, and the light emitting elements are configured to respond to the current output by the pixel circuits of the sub-pixels to emit light with corresponding brightness.

In an exemplary embodiment, the pixel unit may include four sub-pixels, and the four sub-pixels may be arranged horizontally, vertically or squarely, which is not limited in this disclosure.

In one exemplary implementation, four sub-pixels may be arranged in a Square manner to form a GGRB pixel arrangement. In another exemplary implementation, the four sub-pixels may be arranged in a manner of diamond to form an RGGB pixel arrangement.

In an exemplary embodiment, the first sub-pixel may be a red sub-pixel (R) emitting red light, the second sub-pixel may be a blue sub-pixel (B) emitting blue light, the third sub-pixel may be a green sub-pixel (G) emitting green light, and the fourth sub-pixel may be a white sub-pixel (W) emitting white light. In an exemplary implementation mode, a shape of a sub-pixel in a pixel unit may be a rectangle, a rhombus, a pentagon, or a hexagon, etc., and the sub-pixels may be arranged in a manner to stand side by side horizontally, in a manner to stand side by side vertically, in a manner to form a square, or in a manner to form a diamond, etc., and the present disclosure is not limited herein.

In an exemplary embodiment, the pixel unit may include three sub-pixels, the three sub-pixels may be arranged in manner of horizontal juxtaposition, vertical juxtaposition or triangle, which is not limited in the present disclosure.

In an exemplary embodiment, the first sub-pixel may be a red sub-pixel (R) emitting red light, the second sub-pixel may be a blue sub-pixel (B) emitting blue light, and the third sub-pixel may be green sub-pixels (G) emitting green light. The shapes of the three sub-pixels may be triangles, rectangles, rhombuses, pentagons, or hexagons, etc., which are not limited in this disclosure, and the sub-pixels may adopt the arrangement approach of a horizontal juxtaposition, a vertical juxtaposition, a square or a diamond, etc., and the present disclosure is not limited herein.

In an exemplary embodiment, the first driving mode may be referred to as a low frequency driving mode and the second driving mode may be referred to as a high frequency driving mode.

In an exemplary embodiment, the refresh rate refers to the number of times that the display substrate refreshes data in one second. The refresh rate of the first drive mode set by the same display substrate is fixed, and the refresh rate of the first drive mode set by different display substrates may be different. Wherein, the refresh rate of the display substrate in the first drive mode may range from 1 Hz to 60 Hz, and, for example, the refresh rate in the first drive mode may be about 10 Hz.

In an exemplary embodiment, the display substrate employs the first drive mode and the second drive mode alternately displaying function in order to reduce the power consumption of the product. In the first drive mode, the display substrate refreshes the display data in a refresh frame and maintains the display data refreshed in the refresh frame in a maintain frame. In the second drive mode, a display frame may include a refresh frame without including a maintain frame. In the second drive mode, the display substrate refreshes display data in a refresh frame. The refresh rate of the display substrate in the second drive mode may range from 60 Hz to 480 Hz and, for example, the refresh rate in the first drive mode may be about 120 Hz.

In an exemplary embodiment, the voltage value of the first data signal may be a DC voltage value near the gray scale L0, and, for example, the voltage value of the first data signal may be a DC voltage value corresponding to the gray scale L0. Exemplarily, the voltage value of the first data signal is determined by debugging according to the flicker condition of the display substrate.

In an exemplary embodiment, the voltage value of the first data signal may be adjusted and matched according to the low frequency flicker condition of displaying low gray scale on the display substrate, so that the flicker condition of displaying any picture can be weakened or eliminated.

In an exemplary embodiment, the voltage value of the first data signal may be a high-level signal of the first power supply line.

In the present disclosure, the data signal line of the pixel circuit maintains a constant voltage value of the first data signal in the maintain frame, i.e. the first data signal maintains a fixed voltage, pixel circuits displaying different gray scales can have the same electrode pressure difference of the drive transistor in the maintain frame, which can be matched with the electrode pressure difference of the drive transistor, which is beneficial to achieving the dynamic balance between the refresh frame and the maintain frame, makes the flicker phenomenon of the display substrate invisible, and improves the display effect of the display substrate. Wherein, the electrode pressure difference of the drive transistor includes a voltage difference between a control electrode and a first electrode of the drive transistor and a voltage difference between the control electrode and a second electrode.

In the present disclosure, the first initial signal provided by the first initial signal line Vinit1 in the refresh frame and the maintain frame is an AC signal, which can eliminate the difference between the anode reset starting points of the light emitting element in the refresh frame and the maintain frame and the electrode pressure difference of the drive transistor, achieve the dynamic balance between the refresh frame and the maintain frame, eliminate the flicker phenomenon of the display substrate, and improve the display effect of the display substrate.

A display substrate according to the present disclosure includes: a first drive mode and a second drive mode, the first drive mode has a refresh rate less than that of the second drive mode, wherein the contents displayed on the display substrate include a plurality of display frames, wherein in the first drive mode, the display frames include: a refresh frame and at least one maintain frame. The display substrate includes: pixel circuits arranged in an array, and a pixel circuit includes: a write transistor, an anode reset transistor, a data signal line extending along a first direction, and a first initial signal line extending along a second direction; the data signal line is electrically connected to a first electrode of the write transistor, the first initial signal line is electrically connected to a first electrode of the anode reset transistor, and the first direction intersects with the second direction. The data signal line provides a first data signal in the maintain frame, the voltage value of the first data signal is constant, and/or the first initial signal line provides a first initial signal in the refresh frame and the maintain frame, wherein the first initial signal is an AC signal. The display substrate according to the embodiment of the present disclosure provides a first data signal in a maintain frame through a data signal line, and/or a first initial signal is provided in a refresh frame and a maintain frame through a first initial signal line, which can achieve the dynamic balance of the refresh frame and the maintain frame of the display substrate in a first drive mode and eliminate the flicker phenomenon of the display substrate.

In an exemplary embodiment, the data signal line Data provides a second data signal during a partial time period of the refresh frame, wherein the voltage value of the first data signal is greater than or equal to the voltage value of the second data signal.

In an exemplary embodiment, the partial time period may be a time period in which the signal of the first scan signal line Gate1 in the refresh frame is an effective level signal.

Of course, the data signal line Data may provide the second data signal repeatedly for several times in the refresh frame or may last the partial time period longer. For example, the partial time period may be a time period in which the signal of the first scan signal line Gate1 in the refresh frame is turned on to the end of the refresh frame. Alternatively, the partial time period may be a time period in which the signal of the first scan signal line Gate1 in the refresh frame is turned on until the first stage P31 is turned on but the refresh frame is not finished. For example: the starting point of the partial time period is when the signal of the first scan signal line Gate1 is turned on as an active level signal, and the end point of the partial time period is between the start of the first stage P31 and the end point of the refresh frame. (FIGS. 4 through 8, for example)

In an exemplary embodiment, the data signal line Data does not provide a signal for the rest of the partial time of the refresh frame. Wherein, the rest of the partial time refers to a time period in which the signal of the first scan signal line Gate1 in the refresh frame is an invalid level signal.

Of course, the rest of the partial time of the data signal line Data in the refresh frame may be a period of time in the refresh frame in which the data signal line Data does not provide a signal.

In an exemplary embodiment, the time difference between the time at which the rising edge or falling edge of the first initial signal occurs and the maintain frame start time is less than the duration for which the light emitting signal line is an effective level signal.

In an exemplary embodiment, as shown in FIGS. 4 to 7, the first initial signal may include a first sub-initial signal VS1 and a second sub-initial signal VS2. The first initial signal line provides a first sub-initial signal VS1 in a refresh frame and a second sub-initial signal VS2 in a maintain frame.

In an exemplary embodiment, as shown in FIGS. 4 to 7, an average voltage value of the second sub-initial signal VS2 is greater than an average voltage value of the first sub-initial signal VS1, that is, the duration of the second sub-initial signal VS2 being a high-level signal is longer than the duration of the first sub-initial signal VS1 being a high-level signal, and the duration of the second sub-initial signal VS2 being a low-level signal is smaller than the duration of the first sub-initial signal VS1 being a low-level signal.

In an exemplary embodiment, the average voltage value of the second sub-initial signal is larger than the average voltage value of the first sub-initial signal, so that the voltage difference between the refresh frame and the maintain frame of the fifth node N5 can be complemented, so that the brightening speed of the light emitting element of the display substrate in the maintain frame is consistent with that of the refresh frame, and the low frequency flicker problem of low gray scale can be avoided.

In an exemplary embodiment, the first scan signal line Gate1, the second scan signal line Gate2, the light emitting signal line EM, the reset signal line Reset and the second initial signal line Vinit2 extend along the second direction, the second power supply line VSS and the first power supply line VDD may extend in the first direction.

In an exemplary embodiment, as shown in FIGS. 4 to 7, the second initial signal line Vinit2 provides a second initial signal in a refresh frame and a maintain frame, the second initial signal is a DC signal, and the voltage value of the second initial signal is constant. For example, the voltage value of the second initial signal may be less than the average voltage value of the first sub-initial signal VS1.

In an exemplary embodiment, as shown in FIGS. 4 to 7, the refresh frame may include an initialization stage P1, a data write stage P2, and a refresh light emitting stage P3 that occur in sequence. The refresh light emitting stage P3 includes a plurality of first stages P31 and a plurality of second stages P32, the first stage P31 and the second stage P32 alternately occur, the first first stage occurs before the first second stage. FIGS. 4 to 7 illustrate two first stages and a second stage as examples.

In an exemplary embodiment, the second data signal is a data write stage at a time period in which the refresh frame occurs.

In an exemplary embodiment, the rising edge or falling edge of the first initial signal occurs at the last stage of the refresh frame. The last stage of the refresh frame is a first stage P31 or may be a second stage P32. FIGS. 4 to 7 illustrate the first stage P31 as the last stage of the refresh frame as an example.

In an exemplary embodiment, there may or may not be an interval between an occurrence time of the initialization stage P1 and an occurrence time of the data write stage P2, and FIGS. 4 to 11 are illustrated by taking there is the interval between the occurrence time of the initialization stage P1 and the occurrence time of the data write stage P2 as an example.

In an exemplary embodiment, as shown in FIGS. 4 to 11, the signal of the reset signal line Reset is a valid level signal in the initialization stage P1 and an invalid level signal in the data write stage P2 and the first stage P31. The valid level signal is a level signal that causes the transistor to be turned on, that is, an ON voltage signal of the transistor, and the invalid level signal is a level signal that causes the transistor to be turned off, that is, an OFF voltage signal of the transistor.

In an exemplary embodiment, as shown in FIGS. 4 to 11, the signal of the first scan signal line Gate1 is a valid level signal in the data write stage P2 and an invalid level signal in the initialization stage P1 and the first stage P31.

In an exemplary embodiment, as shown in FIGS. 4 to 11, the second scan signal line Gate2 is a valid level signal in the initialization stage P1 and the data write stage P2, and an invalid level signal in the first stage P31 and the second stage P32.

In an exemplary embodiment, as shown in FIGS. 4 to 11, the light emitting signal line EM is an invalid level signal in the initialization stage P1, the data write stage P2 and the second stage P32, and is an invalid level signal in the first stage P31.

In an exemplary embodiment, as shown in FIGS. 4 to 11, the duration of the first stage P31 is equal to the duration of the light emitting signal line EM being a valid level signal, and the duration of the second stage P32 is equal to the duration of the signal of the light emitting signal line EM being an invalid level signal.

In an exemplary embodiment, as shown in FIGS. 4-11, the maintain frame may include a plurality of third stages P41 and a plurality of fourth stages P42, the third stages P41 and fourth stage P42 alternately occurs. FIGS. 4 to 7 are illustrated with two third stages and two fourth stages as examples.

In an exemplary embodiment, as shown in FIGS. 4 to 11, the signal of the second scan signal line Gate2 is an invalid level signal in the third stage P41 and the fourth stage P42.

In an exemplary embodiment, as shown in FIGS. 4 to 11, the signal of the light emitting signal line EM is an invalid level signal in the third stage P41, and the signal of the light emitting signal line EM is a valid level signal in the fourth stage P42.

In an exemplary embodiment, as shown in FIGS. 4 to 11, the first scan signal line Gate1 and the reset signal line Reset are low-level signals in the fourth stage P42.

In an exemplary embodiment, as shown in FIGS. 4 to 11, the duration of the third stage P41 is equal to the duration of the signal of the light emitting signal line EM being an invalid level signal, and the duration of the fourth stage P42 is equal to the duration of the light emitting signal line EM being a valid level signal.

In an exemplary embodiment, as shown in FIGS. 4 to 11, the signal of the light emitting signal line EM in the last stage of the refresh light emitting stage and the signal in the first stage of the maintain frame are mutually inverse signals. That is, when the signal of the light emitting signal line EM at the last stage of the refresh light emitting stage is a valid level signal, the signal of the light emitting signal line EM at the first stage of the maintain frame is an invalid level signal, and when the signal of the light emitting signal line EM at the last stage of the refresh light emitting stage is an invalid level signal, the signal of the light emitting signal line EM at the first stage of the maintain frame is a valid level signal.

In an exemplary embodiment, the last stage of the refresh light emitting stage may be a first stage or may be a second stage. When the last stage of the refresh light emitting stage is the first stage, the first stage of the maintain frame is the third stage, at this time, the first third stage occurs before the first fourth stage. When the last stage of the refresh light emitting stage is the second stage, the first stage of the maintain frame is the fourth stage, at this time, the first fourth stage occurs before the first third stage. FIGS. 4 to 7 are illustrated by taking that the last stage of the refresh light emitting stage is the first stage as an example.

In an exemplary embodiment, as shown in FIGS. 4-11, the first third stage P41 may include a first maintain sub-stage P410 and a second maintain sub-stage P420.

In an exemplary embodiment, as shown in FIGS. 4 to 11, the first maintain sub-stage P410 occurs before the second maintain sub-stage P420, and the sum of the durations of the first maintain sub-stage P410 and the second maintain sub-stage P420 is less than the duration of the signal of the light emitting signal line EM being an invalid level signal.

In an exemplary embodiment, as shown in FIGS. 4 to 11, the signal of the reset signal line Reset is a valid level signal in the first maintain sub-stage P410 and an invalid level signal in a first time period, the first time period is a time period other than the first maintain sub-stage PP410 in the first third stage.

In an exemplary embodiment, as shown in FIGS. 4 to 11, the signal of the first scan signal line Gate1 is a valid level signal in the second maintain sub-stage P420 and an invalid level signal in a second time period, wherein the second time period is a time period other than the second maintain sub-stage in the first third stage.

In an exemplary embodiment, as shown in FIGS. 4 to 11, the duration that the signal of the reset signal line Reset is a valid level signal is smaller than the duration that the second scan signal line Gate2 is a valid level signal.

In an exemplary embodiment, as shown in FIGS. 4 to 11, the duration that the signal of the first scan signal line Gate1 is a valid level signal is less than the duration that the signal of the second scan signal line Gate2 is a valid level signal.

In an exemplary embodiment, as shown in FIGS. 4 to 11, the duration that the signal of the reset signal line Reset is a valid level signal is less than or equal to the duration that the signal of the first scan signal line Gate1 is a valid level signal.

In an exemplary embodiment, as shown in FIGS. 4 to 11, the duration that the signal of the second scan signal line Gate2 is a valid level signal is smaller than the duration that the signal of the light emitting signal line EM is an invalid level signal.

In an exemplary embodiment, the signals of the reset signal line Reset and the first scan signal line Gate1 are invalid level signals at the second stage P32.

In an exemplary embodiment, as shown in FIGS. 4 and 8, the signals of the reset signal line Reset and the first scan signal line Gate1 are invalid level signals in the second third stage to the Nth third stage.

In an exemplary embodiment, taking the pixel circuit of FIG. 3A as an example, the operating process of a pixel circuit provided by an exemplary embodiment will be explained with reference to the first transistor T1 to the seventh transistor T7 being P-type transistors and the eighth transistor T8 being N-type transistors as shown in FIG. 3A, FIG. 4 to FIG. 7. As shown in FIG. 4, the operating process of the pixel circuit may include an initialization stage P1 of a refresh frame, a data write stage P2, and a refresh light emitting stage P3. The refresh light emitting stage P3 includes a plurality of first stages P31 and a plurality of second stages P32, a third stage P41 of a maintain frame and a plurality of fourth stages P42, the first third stage P41 includes a first maintain sub-stage P410 and a second maintain sub-stage P420.

In the initialization stage P1, the signals of the first scan signal line Gate1, the second scan signal line Gate2 and the light emitting signal line EM are all high-level signals, and the signal of the reset signal line Reset is a low-level signal. When the signal of the reset signal line Reset is a low-level signal, the first transistor T1 is turned on, the second initial signal of the second initial signal line Vinit2 is supplied to the fourth node N4, the seventh transistor T7 is turned on, and the first initial signal of the first initial signal line Vinit1 is supplied to the fifth node N5, that is, the first electrode of the light emitting element L. The first electrode of the light emitting element L is initialized (reset), the internal pre-stored voltage is cleared, and the initialization is completed to ensure that the light emitting element L does not emit light. The signal of the second scan signal line Gate2 is a high-level signal, the eighth transistor T8 is turned on. The signal of the fourth node N4 is provided to the first node N1, and the signal of the first node N1 is a low-level signal, the capacitor C is initialized and the original data voltage in the capacitor C is cleared. The signals of the first scan signal line Gate1 and the light emitting signal line EM are high-level signals, the second transistor T2, the fourth transistor T4, the fifth transistor T5 and the sixth transistor T6 are turned off, and the light emitting element L does not emit light at this stage.

In the data write stage P2, the signal of the first scan signal line Gate1 is a low-level signal, the signals of the reset signal line Reset, the light emitting signal line EM and the second scan signal line Gate2 are high-level signals, and the data signal line Data outputs data voltages. In this stage, the first node N1 maintains a low-level signal, and the third transistor T3 is turned on. The signal of the first scan signal line Gate1 is a low-level signal, the second transistor T2 and the fourth transistor T4 are turned on, the signal of the second scan signal line Gate2 is a high-level signal, and the eighth transistor T8 is turned on. The second transistor T2, the fourth transistor T4, and the eighth transistor T8 are turned on so that a data voltage output from the data signal line Data is provided to the first node N1 through a third node N3, the turned-on third transistor T3, a second node N2, the turned-on second transistor T2, the fourth node N4, and the turned-on eighth transistor T8. A difference between the data voltage output by the data signal line Data and a threshold voltage of the third transistor T3 is charged into the capacitor C until a voltage of the first node N1 is $Vd-|Vth|$, wherein Vd is the data voltage output by the data signal line Data, and Vth is the threshold voltage of the third transistor T3. The signals of the reset signal line Reset and the light emitting signal line EM are high-level signals, the first transistor T1, the seventh transistor T7, the fifth transistor T5 and the sixth transistor T6 are turned off, and the light emitting element L does not emit light at this stage.

In the first stage P31, the signals of the light emitting signal line EM and the second scan signal line Gate2 are low-level signals, and the signals of the first scan signal line Gate1 and the reset signal line Reset are high-level signals. When the signals of the first scan signal line Gate1 and the reset signal line Reset are high-level signals, and the first transistor T1, the second transistor T2, the fourth transistor T4 and the seventh transistor T7 are turned off. The signal of the second scan signal line Gate2 is a low-level signal, and the eighth transistor T8 is turned off. The signals of the light emitting signal line EM are low-level signals, to cause the fifth transistor T5 and the sixth transistor T6 to be turned on, and a power supply voltage outputted by the first power supply line VDD provides a driving voltage to the first electrode of the light emitting element L through the fifth transistor T5, third transistor T3 and sixth transistor T6, which are all turned on, to drive the light emitting element L to emit light. At this stage, the signal of the fifth node N5 is a high-level signal.

In the second stage P32, the signals of the light emitting signal line EM, the first scan signal line Gate1 and the reset signal line Reset are all high-level signals, and the signal of the second scan signal line Gate2 is a low-level signal. The first transistor T1 to the eighth transistor T8 are turned off. At this stage, the fifth node N5 maintains a high-level signal and drives the light emitting element L to emit light.

In the first maintain sub-stage P410, the light emitting signal line EM and the first scan signal line Gate1 are high-level signals, and the signals of the second scan signal line Gate2 and the reset signal line Reset are low-level signals. The signal of the reset signal line Reset is a low-level signal, the first transistor T1 is turned on, the second initial signal of the second initial signal line Vinit2 is supplied to the fourth node N4, the seventh transistor T7 is turned on, and the first initial signal of the first initial signal line Vinit1 is supplied to the fifth node N5. The fifth node N5 is provided with a low-level signal. That is, the first electrode of the light emitting element L is provided with a low-level signal. The first electrode of the light emitting element L is initialized (reset), the internal pre-stored voltage is cleared, and the initialization is completed to ensure that the light emitting element L does not emit light. The signal of the second scan signal line Gate2 is a low-level signal, the eighth transistor T8 is turned off, the signal of the fourth node N4 is not supplied to the first node N1, and the first node N1 maintains a low-level signal. The signals of the first scan signal line Gate1 and the light emitting signal line EM are high-level signals, the second transistor T2, the fourth transistor T4, the fifth transistor T5 and the sixth transistor T6 are turned off, and the light emitting element L does not emit light at this stage.

In the second maintain sub-stage P420, the signals of the light emitting signal line EM and the reset signal line Reset are high-level signals, and the signals of the first scan signal line Gate1 and the second scan signal line Gate2 are low-level signals. The signal of the first scan signal line Gate1 is a low-level signal, the second transistor T2 and the fourth transistor T4 are turned on, the signal of the second scan signal line Gate2 is a low-level signal, and the eighth transistor T8 is turned off. The signals of the reset signal line Reset and the light emitting signal line EM are high-level signals, the first transistor T1, the seventh transistor T7, the fifth transistor T5 and the sixth transistor T6 are turned off, the fifth node N5 is provided with a low-level signal, and the light emitting element L does not emit light at this stage.

In the fourth stage P42, the signals of the first scan signal line Gate1 and the reset signal line Reset are high-level signals, and the signals of the light emitting signal line EM and the second scan signal line Gate2 are low-level signals. The signals of the first scan signal line Gate1 and the reset signal line Reset are high-level signals, and the first transistor T1, the seventh transistor T7, the second transistor T2, and the fourth transistor T4 are turned off. The signal of the second scan signal line Gate2 is a low-level signal, the eighth transistor T8 is turned off, the signal of the light emitting signal line EM is a low-level signal, the fifth transistor T5 and the sixth transistor T6 are turned on, the third transistor T3 is turned off, the light emitting element L does not emit light, and the fifth node N5 is a high-level signal at this stage.

Except the first third stage, the operation process of the third stage P41 is the same as the operation process of the second stage P32, and the present disclosure is not repeated herein.

In a drive process of the refresh frame of the pixel circuit, a drive current flowing through the third transistor T3 (drive transistor) is determined by a voltage difference between a control electrode and a first electrode of the third transistor T3. Because the voltage of the first node N1 is Vd−|Vth|, the drive current of the third transistor T3 is as follows:

$$I = K*(Vgs - Vth)^2 = K*[(Vdd - Vd + |Vth|) - Vth]^2 = K*[(Vdd - Vd)]^2$$

Among them, I is the drive current flowing through the third transistor T3, that is, the drive current for driving an OLED, K is a constant, Vgs is the voltage difference between the control electrode and the first electrode of the third transistor T3, Vth is the threshold voltage of the third transistor T3, Vd is the data voltage output by the data signal line Data, and Vdd is the power supply voltage output by the first power supply terminal VDD.

In the operation timing of the pixel circuit provided in FIG. 4, the frequency of the signal of the light emitting signal line EM is greater than the frequency of the signal of the first scan signal line Gate1 and is greater than the frequency of the signal of the reset signal line Reset.

In an exemplary embodiment, as shown in FIG. 5, the second stage P32 may include a first refresh sub-stage P310.

In an exemplary embodiment, as shown in FIG. 5, the signal of the first scan signal line Gate1 is an invalid level signal in the second stage P32.

In an exemplary embodiment, as shown in FIG. 5, the signal of the reset signal line Reset is a valid level signal in the first refresh sub-stage P310 and an invalid level signal in the third time period. Wherein, the third time period is the time period other than the first refresh sub-stage in the second stage.

In an exemplary embodiment, as shown in FIG. 5, any third stage of the second third stage to Nth third stage may include a third maintain sub-stage P430.

In an exemplary embodiment, N is greater than or equal to 2, N=M/K, where M is a reference frequency of the display substrate and K is a refresh rate of the display substrate in the first drive mode, where the reference frequency is a refresh rate of the second drive mode or a preset refresh rate. Wherein, M may be 60 Hz, 120 Hz, or 240 Hz, and the present disclosure is not limited in any way.

For example, when M is 60 Hz and K is 30 Hz, at this time, N=2 (60/30); When K is 10 Hz, at this time, N=6; When M is 120 Hz and K is 30 Hz, at this time, N=4, and the value of N is not limited in this disclosure.

In an exemplary embodiment, as shown in FIG. 5, the signal of the first scan signal line Gate1 is an invalid level signal from the second third stage to the Nth third stage.

In an exemplary embodiment, as shown in FIG. 5, the reset signal line Reset is a valid level signal at a third maintain sub-stage P430 in any third stage from the second third stage to the Nth third stage, and is an invalid level signal in a fourth time period. Wherein, the fourth time period is a time period of a third stage except the third maintain sub-stage, the third stage is any of third stage from the second third stage to the Nth third stage.

In an exemplary embodiment, as shown in FIG. 5, a frequency at which the signal of the reset signal line Reset is a valid level signal is equal to a frequency at which the signal of the light emitting signal line EM is an invalid level signal.

In an exemplary embodiment, the frequency of the signal of the light emitting signal line EM depends on how many pulses are configured within a frame. Assuming that x pulses are configured to the signal of the light emitting signal line EM in one frame, the EM frequency satisfies the product of the reference frequency and the quantity of pulses. For example, when the reference frequency of the display substrate is 60 Hz and x=2, the frequency of the signal of the light emitting signal line EM is 120 Hz. The frequency of the signal of the light emitting signal line EM may be the frequency at which the light emitting signal line EM is a valid level signal or may be the frequency at which the light emitting signal line EM is an invalid level signal.

In an exemplary embodiment, the operating process of a pixel circuit provided by an exemplary embodiment will be explained with reference to the first transistor T1 to the seventh transistor T7 being P-type transistors and the eighth transistor T8 being N-type transistors as shown in FIG. 3A to FIG. 5. As shown in FIG. 5, the operating process of the pixel circuit may include an initialization stage P1 of a refresh frame, a data write stage P2, and a refresh light emitting stage P3. The refresh light emitting stage P3 includes a plurality of first stages P31 and a plurality of second stages P32, the second stage includes a first refresh sub-stage P310, a third stage P41 of a maintain frame and a plurality of fourth stages P42, the first third stage P41 includes a first maintain sub-stage P410 and a second maintain sub-stage P420, any third stage from the second third stage to the Nth third stage may include a third maintain sub-stage.

The initialization stage P1, data write stage P2, first stage P31, first maintain sub-stage P410, second maintain sub-stage P420 and fourth stage P42 of the working timing of the pixel circuit provided in FIG. 5 are respectively the same as the initialization stage P1, data write stage P2, first stage P31, first maintain sub-stage P410, second maintain sub-stage P420 and fourth stage P42 of the working timing of the pixel circuit provided in FIG. 4, which will not be further described here.

The operation timing of the pixel circuit provided in FIG. 5 differs from the operation timing of the pixel circuit provided in FIG. 4 in that the first refresh sub-stage and the third maintain sub-stage in the operation timing of the pixel circuit provided in FIG. 5.

In the first refresh sub-stage, the signals of the light emitting signal line EM and the first scan signal line Gate1 are high-level signals, and the signals of the reset signal line Reset and the second scan signal line Gate2 are low-level signals. The signal of the reset signal line Reset is a low-level signal, the first transistor T1 is turned on, the second initial signal of the second initial signal line Vinit2 is supplied to the fourth node N4, the seventh transistor T7 is turned on, and the first initial signal of the first initial signal line Vinit1 is supplied to the fifth node N5. The fifth node N5 is provided with a low-level signal. That is, the first electrode of the light emitting element L is provided with a low-level signal. The first electrode of the light emitting element L is initialized (reset), the internal pre-stored voltage is cleared, and the initialization is completed to ensure that the light emitting element L does not emit light. The signal of the second scan signal line Gate2 is a low-level signal, the eighth transistor T8 is turned off, the signal of the fourth node N4 is not supplied to the first node N1, and the first node N1 maintains a low-level signal. The signals of the first scan signal line Gate1 and the light emitting signal line EM are high-level signals, the second transistor T2, the fourth transistor T4, the fifth transistor T5 and the sixth transistor T6 are turned off, and the light emitting element L does not emit light at this stage.

The third maintain sub-stage in the operation timing of the pixel circuit provided in FIG. 5 is the same as the operating process of the first maintain sub-stage in the operation timing of the pixel circuit provided in FIG. 4.

The operation timing of the pixel circuit provided in FIG. 5 is different from that of the pixel circuit provided in FIG. 4 in that the frequency of the signal of the reset signal line in the operation timing of the pixel circuit provided in FIG. 5 is the same as the frequency of the signal of the light emitting signal line, so that the change period of the light emitting of the light emitting element is the same as the change period of the light emitting signal line. That is, the operation timing of the pixel circuit provided in FIG. 5 increases the reset frequency of the anode of the light emitting element.

The operation timing of the pixel circuit provided in FIG. 5 improves the flicker problem of the display substrate in the first drive mode by increasing the reset frequency of the anode of the light emitting element and reducing the change period of the light emitting of the light emitting element, thus improving the display effect of the display substrate.

In an exemplary embodiment, as shown in FIG. 6, the second stage P32 may include a second refresh sub-stage P320.

In an exemplary embodiment, as shown in FIG. 6, the signal of the reset signal line Reset is an invalid level signal in the second stage P320.

In an exemplary embodiment, as shown in FIG. 6, the signal of the first scan signal line Gate1 is a valid level signal in the second refresh sub-stage P320 and is an invalid level signal in a fifth time period, the fifth time period is a time period except the second refresh sub-stage in the second stage.

In an exemplary embodiment, as shown in FIG. 6, any third stage of the second third stage to Nth third stage may include a fourth maintain sub-stage P440.

In an exemplary embodiment, as shown in FIG. 6, the signal of the reset signal line Reset is an invalid level signal from the second third stage to the Nth third stage.

In an exemplary embodiment, as shown in FIG. 6, the first scan signal line Gate1 is a valid level signal at the fourth maintain sub-stage P440 in any third stage from the second third stage to the Nth third stage, and is an invalid level signal in a sixth time period, wherein the sixth tie period is a time period except a fourth maintain sub-stage in any third stage from the second third stage to the Nth third stage.

In an exemplary embodiment, as shown in FIG. 6, the frequency at which the signal of the first scan signal line Gate1 is a valid level signal is equal to the frequency at which the signal of the light emitting signal line EM is an invalid level signal, and is greater than the frequency at which the signal of the reset signal line Reset is a valid level signal.

In an exemplary embodiment, the operating process of a pixel circuit provided by an exemplary embodiment will be explained with reference to the first transistor T1 to the seventh transistor T7 being P-type transistors and the eighth transistor T8 being N-type transistors as shown in FIG. 3 to FIG. 6. As shown in FIG. 6, the operating process of the pixel circuit may include an initialization stage P1 of a refresh frame, a data write stage P2, and a refresh light emitting stage P3. The refresh light emitting stage P3 includes a plurality of first stages P31 and a plurality of second stages P32, the second stage includes a second refresh sub-stage P320, a third stage P41 of a maintain frame and a plurality of fourth stages P42, the first third stage P41 includes a first maintain sub-stage P410 and a second maintain sub-stage P420, any third stage of the second third stage to the Nth third stage may include a fourth maintain sub-stage P420.

The initialization stage P1, data write stage P2, first stage P31, first maintain sub-stage P410, second maintain sub-stage P420 and fourth stage P42 in FIG. 6 are respectively the same as the initialization stage P1, data write stage P2, first stage P31, first maintain sub-stage P410, second maintain sub-stage P420 and fourth stage P42 in FIG. 4, which will not be further described here.

The operation timing of the pixel circuit provided in FIG. 6 differs from the operation timing of the pixel circuit provided in FIG. 4 in that the second refresh sub-stage P320 and the fourth maintain sub-stage P440 in the operation timing of the pixel circuit provided in FIG. 6.

In the second refresh sub-stage P320, the signals of the light emitting signal line EM and the reset signal line Reset are high-level signals, and the signals of the first scan signal line Gate1 and the second scan signal line Gate2 are low-level signals. The signal of the first scan signal line Gate1 is a low-level signal. When the signal of the first scan signal line Gate1 is a low-level signal, the second transistor T2 and the fourth transistor T4 are turned on, the signal of the second scan signal line Gate2 is a low-level signal, and the eighth transistor T8 is turned off. The signals of the reset signal line Reset and the light emitting signal line EM are high-level signals, the first transistor T1, the seventh transistor T7, the fifth transistor T5 and the sixth transistor T6 are turned off.

In the fourth maintain sub-stage P440, the signals of the light emitting signal line EM and the reset signal line Reset are high-level signals, and the signals of the first scan signal line Gate1 and the second scan signal line Gate2 are low-level signals. When the signal of the first scan signal line Gate1 is a low-level signal, the second transistor T2 and the fourth transistor T4 are turned on, when the signal of the second scan signal line Gate2 is a low-level signal, and the eighth transistor T8 is turned off. The signals of the reset signal line Reset and the light emitting signal line EM are high-level signals, the first transistor T1, the seventh transistor T7, the fifth transistor T5 and the sixth transistor T6 are turned off.

The operation timing of the pixel circuit provided in FIG. 6 differs from that of the pixel circuit provided in FIG. 4 in that, the frequency of the signal of the first scan signal line Gate1 in the operation timing of the pixel circuit provided in FIG. 6 is the same as the frequency of the signal of the light emitting signal line, so that the change period of the electrode pressure difference of the drive transistor is the same as the change period of the light emitting signal line. That is, the operation timing of the pixel circuit provided in FIG. 6 increases the reset frequency of the first electrode of the drive transistor.

In the operation timing of the pixel circuit provided in FIG. 6, by increasing the reset frequency of the first electrode of the drive transistor, the electrode pressure difference of the drive transistor is the same at different stages, which reduces the period of characteristic change of the drive transistor, improves the flicker problem of the display substrate in the first drive mode, and improves the display effect of the display substrate.

In an exemplary embodiment, as shown in FIG. 7, the second stage P32 may include a first refresh sub-stage P310 and a third refresh sub-stage P330. The sum of the durations of the first refresh sub-stage P310 and the third refresh sub-stage P330 is less than the duration of the second stage P32.

In an exemplary embodiment, as shown in FIG. 7, the signal of the reset signal line Reset is a valid level signal at the first refresh sub-stage P310 and is an invalid level signal at a third time period, which is a time period except the first refresh sub-stage in the second stage.

In an exemplary embodiment, as shown in FIG. 7, the first scan signal line Gate1 is a valid level signal at the third refresh sub-stage P330 and is an invalid level signal at the seventh time period, the seventh time period is a time period except the third refresh sub-stage in the second stage.

In an exemplary embodiment, as shown in FIG. 7, any third stage of the second third stage to Nth third stage may include a third maintain sub-stage P430 and a fifth maintain sub-stage P450. The sum of the durations of the third maintain sub-stage P430 and the second maintain sub-stage P450 is less than the duration of the third stage.

In an exemplary embodiment, as shown in FIG. 7, the signal of the reset signal line Reset is a valid level signal at the third maintain sub-stage P430 of the second third stage to the Nth third stage, and is an invalid level signal at the fourth time period, the fourth time period is a time period except the third maintain sub-stage in the second stage.

In an exemplary embodiment, as shown in FIG. 7, a fifth maintain sub-stage P450 of the first scan signal line Gate1 in any third stage from the second third stage to the Nth third stage is a valid level signal, and is an invalid level signal in the eighth time period, eighth time period is a time period except the fifth maintain sub-stage of any third stage from the second third stage to the Nth third stage.

In an exemplary embodiment, as shown in FIG. 7, the frequency at which the signal of the reset signal line Reset is a valid level signal and the frequency at which the signal Gate1 of the first scan signal line is a valid level signal are both equal to the frequency at which the signal of the light emitting signal line is an invalid level signal.

In an exemplary embodiment, the operating process of a pixel circuit provided by an exemplary embodiment will be explained with reference to the first transistor T1 to the seventh transistor T7 being P-type transistors and the eighth transistor T8 being N-type transistors as shown in FIG. 3 to FIG. 7. As shown in FIG. 7, the operating process of the pixel circuit may include an initialization stage P1 of a refresh frame, a data write stage P2, and a refresh light emitting stage P3. The refresh light emitting stage P3 includes a plurality of first stages P31 and a plurality of second stages P32, the second stage includes a first refresh sub-stage P310 and a third refresh sub-stage P330, a third stage P41 of a maintain frame and a plurality of fourth stages P42, the first third stage P41 includes a first maintain sub-stage P410 and a second maintain sub-stage P420, any third stage of the second third stage to Nth third stage may include a third maintain sub-stage P430 and a fifth maintain sub-stage P450.

The initialization stage P1, data write stage P2, first stage P31, first maintain sub-stage P410, second maintain sub-stage P420 and fourth stage P42 of the working timing of the pixel circuit provided in FIG. 7 are respectively the same as the initialization stage P1, data write stage P2, first stage P31, first maintain sub-stage P410, second maintain sub-stage P420 and fourth stage P42 of the working timing of the pixel circuit provided in FIG. 4, which will not be further described here.

The operation timing of the pixel circuit provided in FIG. 7 differs from the operation timing of the pixel circuit provided in FIG. 4 in that the first refresh sub-stage, the third refresh sub-stage, the third maintain sub-stage and the fifth maintain sub-stage of the operation timing of the pixel circuit provided in FIG. 7.

The operation process of the first refresh sub-stage of the operation timing of the pixel circuit provided in FIG. 7 is the same as the operation process of the first refresh sub-stage of the operation timing of the pixel circuit provided in FIG. 5, and the present disclosure is not repeated herein. The operation process of the third maintain sub-stage of the operation timing of the pixel circuit provided in FIG. 7 is the same as the operation process of the third maintain sub-stage of the operation timing of the pixel circuit provided in FIG. 6, and the present disclosure is not repeated herein.

In the third refresh sub-stage, the signals of the light emitting signal line EM and the reset signal line Reset are high-level signals, and the signals of the first scan signal line Gate1 and the second scan signal line Gate2 are low-level signals. When the signal of the first scan signal line Gate1 is a low-level signal, the second transistor T2 and the fourth transistor T4 are turned on. The signal of the second scan signal line Gate2 is a low-level signal, and the eighth transistor T8 is turned off. The signals of the reset signal line Reset and the light emitting signal line EM are high-level signals, the first transistor T1, the seventh transistor T7, the fifth transistor T5 and the sixth transistor T6 are turned off, and the fifth node N5 is a low-level signal due to the reset of the fifth node N5 in the first refresh sub-stage.

In the fifth maintain sub-stage, the signals of the light emitting signal line EM and the reset signal line Reset are high-level signals, and the signals of the first scan signal line Gate1 and the second scan signal line Gate2 are low-level signals. When the signal of the first scan signal line Gate1 is a low-level signal, the second transistor T2 and the fourth transistor T4 are turned on, the signal of the second scan signal line Gate2 is a low-level signal, and the eighth transistor T8 is turned off. The signals of the reset signal line Reset and the light emitting signal line EM are high-level signals, the first transistor T1, the seventh transistor T7, the fifth transistor T5 and the sixth transistor T6 are turned off, and the fifth node N5 is a low-level signal due to the reset of the fifth node N5 in the third maintain sub-stage.

The operation timing of the pixel circuit provided in FIG. 7 is different from that of the pixel circuit provided in FIG. 4 in that the frequency of the signal of the first scan signal line Gate1 of the electrode pressure difference in FIG. 7 is the same as the frequency of the signal of the light emitting signal line, so that the change period of the electrode pressure difference of the drive transistor is the same as the change period of the light emitting signal line. The frequency of the signal of the reset signal line of the electrode pressure difference shown in FIG. 7 is the same as the frequency of the signal of the light emitting signal line, so that the change period of the light emitting of the light emitting element is the same as the change period of the light emitting signal line. That is, the operation timing of the pixel circuit provided in FIG. 7 increases not only the reset frequency of the first electrode of the drive transistor but also the reset frequency of the first electrode of the light emitting element.

According to the operation timing of the pixel circuit provided in FIG. 7, by increasing the reset frequency of the anode of the light emitting element, the change period of the light emitting of the light emitting element is reduced, and by increasing the reset frequency of the first electrode of the drive transistor, the period of the characteristic change of the drive transistor is reduced, thus alleviating the flicker problem of the display substrate in the first drive mode and improving the display effect of the display substrate.

The operation timing of the pixel circuits provided in FIGS. 6 and 7 makes it possible that the down-frequency extension time does not have to be the whole frame, thereby increasing more frequency selection. The greater the number of the first stage and second stage included in the refresh light emitting stages in the refresh frame and number of the third stage and fourth stage included in the maintain frame, the more choices of low frequencies the display substrate can provide, and the more frequency variations the display substrate can be adapted to.

In an exemplary embodiment, timing of the first initial signal line Vinit1, the second initial signal line Vinit2, the reset signal line Reset, the first scan signal line Gate1, the second scan signal line Gate2, the data signal line Data, and the light emitting signal line EM in the operation timing diagram FIGS. 8-11 of the pixel circuit provided in FIG. 3B is the same as timing of the first initial signal line Vinit1, the second initial signal line Vinit2, the reset signal line Reset, the first scan signal line Gate1, the second scan signal line Gate2, the data signal line Data, and the light emitting signal line EM in the operation timing diagram FIGS. 4-7 of the pixel circuit provided in FIG. 3A. The difference is that in FIG. 3B, when the second scan signal line Gate2 is a valid level signal, the second transistor T2 is turned on, when the reset signal line Reset is a valid level signal, the first transistor T1, the seventh transistor T7, and the eighth transistor T8 are turned on, and after the eighth transistor T8 is turned on, the high-level signal of the third initial signal line is supplied to the third node N3. FIG. 8 to FIG. 11 illustrate an example in which the signal of the third initial signal line Vinit 3 is a high-level DC signal. The present disclosure is not limited in this regard.

In an exemplary embodiment, the voltage value of the third initial signal provided by the third initial signal line Vinit3 may be approximately the voltage value of the signal of the first power supply line VDD.

In an exemplary embodiment, the voltage value of the third initial signal provided by the third initial signal line Vinit3 is different from the voltage value of the first initial signal provided by the first initial signal line Vinit1.

In an exemplary embodiment, the third initial signal provided by the third initial signal line Vinit3 may be an AC signal. For example, the change period of the third initial signal supplied by the third initial signal line Vinit3 is consistent with the change period of the first initial signal supplied by the first initial signal line Vinit1.

The display substrate according to the embodiment of the present disclosure may be applied to display products with any resolution.

An embodiment of the present disclosure further provides a display apparatus including a display substrate.

The display substrate is the display substrate according to any of the aforementioned embodiments, and has similar implementation principles and implementation effects, which will not be repeated here.

In an exemplary embodiment, the display apparatus may be any product or component with any display function, such as a display, a television, a mobile phone, a tablet computer, a navigator, a digital photo frame and a wearable display product.

An embodiment of the present disclosure further provides a method for driving a display substrate, which is configured to drive a display substrate, and the method includes:

the data signal line provides a first data signal in a maintain frame, and/or the first initial signal line provides a first initial signal in a refresh frame and a maintain frame. Wherein, the first data signal is a DC signal, the voltage value of the first data signal is constant, and the first initial signal is an AC signal.

The display substrate is the display substrate according to any of the aforementioned embodiments, and has similar implementation principles and implementation effects, which will not be repeated here.

The drawings of the embodiments of the present disclosure only involve structures involved in the embodiments of the present disclosure, and other structures may refer to usual designs.

For clarity, the thickness and dimension of layers or micro-structures are magnified in the accompanying drawings used for describing the embodiments of the present invention. It may be understood that when an element such as a layer, a film, a region, or a substrate is described as being "on" or "under" another element, the element may be "directly" located "on" or "under" the other element, or there may be an intermediate element.

Although implementations disclosed in the present invention are as the above, the described contents are only implementations used for facilitating understanding the present invention, and are not used for limiting the present invention. Any person skilled in the art to which the present invention pertains may make any modifications and variations in the form and details of implementation without departing from the spirit and the scope disclosed in the present invention. Nevertheless, the scope of patent protection of the present invention shall still be subject to the scope defined by the appended claims.

The invention claimed is:

1. A display substrate, wherein drive modes for the display substrate comprise: a first drive mode and a second drive mode, wherein a refresh rate of the display substrate in the first drive mode is less than a refresh rate of the display substrate in the second drive mode, wherein the display substrate is configured to display a plurality of display frames, wherein in the first drive mode, the display frames comprise: a refresh frame and at least one maintain frame; wherein the display substrate comprises pixel circuits arranged in an array, a data signal line and a first initial signal line; and wherein the data signal line provides a first data signal in the maintain frame, a voltage value of the first data signal is constant, and/or the first initial signal line provides a first initial signal in the refresh frame and the maintain frame, wherein the first initial signal is an Alternating Current (AC) signal; or the data signal line provides a first data signal in the maintain frame, a voltage value of the first data signal is constant, wherein the data signal line provides a second data signal during a partial time period of the refresh frame; and the voltage value of the first data signal is greater than or equal to a voltage value of the second data signal.

2. The display substrate according to claim 1, wherein the first initial signal comprises: a first sub-initial signal and a second sub-initial signal; the first initial signal line provides the first sub-initial signal in the refresh frame and provides the second sub-initial signal in the maintain frame; and an average voltage value of the second sub-initial signal is greater than an average voltage value of the first sub-initial signal.

3. The display substrate according to claim 1, wherein the display substrate further comprises: a second initial signal line;

the second initial signal line provides a second initial signal in the refresh frame and the maintain frame, the second initial signal is a Direct Current (DC) signal, and a voltage value of the second initial signal is constant.

4. The display substrate according to claim 1, wherein:

the display substrate further comprises: a reset signal line, a first scan signal line and a light emitting signal line;

the refresh frame comprises an initialization stage, a data write stage and a refresh light emitting stage, the refresh light emitting stage comprises a plurality of first stages and a plurality of second stages, the first stage and the second stage are alternate, and the first first stage is before the first second stage;

a signal of the reset signal line is a valid level signal in the initialization stage and an invalid level signal in the data write stage and the first stage;

a signal of the first scan signal line is a valid level signal in the data write stage and an invalid level signal in the initialization stage and the first stage;

a light emitting signal line is an invalid level signal in the initialization stage, the data write stage and the second stage, and is a valid level signal in the first stage; and the valid level signal is a level signal that causes a transistor to be turned on, the invalid level signal is a level signal that causes the transistor to be turned off, a duration of the first stage is equal to a duration of the light emitting signal line being a valid level signal, and a duration of the second stage is equal to a duration of the signal of the light emitting signal line being an invalid level signal.

5. The display substrate according to claim 4, wherein:

the maintain frame comprises: a plurality of third stages and a plurality of fourth stages, the third stage and the fourth stage are alternate, a signal of the light emitting signal line in a last stage of the refresh light emitting stage and a signal in the first stage of the maintain frame are mutually inverse signals;

a signal of the light emitting signal line is an invalid level signal in the third stage and is a valid level signal in the fourth stage;

the first scan signal line and the reset signal line provide low-level signals in the fourth stage; and a duration of the third stage is equal to a duration of the signal of the light emitting signal line being an invalid level signal, and a duration of the fourth stage is equal to a duration of the signal of the light emitting signal line being a valid level signal.

6. The display substrate according to claim 5, wherein a first third stage comprises a first maintain sub-stage and a second maintain sub-stage, wherein the first maintain sub-stage is before the second maintain sub-stage, and a sum of durations of the first maintain sub-stage and the second maintain sub-stage is less than the duration of the signal of the light emitting signal line being an invalid level signal;

the signal of the reset signal line is a valid level signal in the first maintain sub-stage and an invalid level signal in a first time period, wherein the first time period is a time period except the first maintain sub-stage in the first third stage; and the signal of the first scan signal line is a valid level signal in the second maintain sub-stage and an invalid level signal in a second time period, wherein the second time period is a time period except the second maintain sub-stage in the first third stage.

7. The display substrate according to claim 6, wherein the display substrate further comprises a second scan signal line;

a signal of the second scan signal line is a valid level signal at the initialization stage and the data write stage, and is an invalid level signal at the first stage and the second stage;

the signal of the second scan signal line is an invalid level signal in the third stage and the fourth stage; and a duration of the signal of the second scan signal line being a valid level signal is smaller than a duration of the signal of the light emitting signal line being an invalid level signal.

8. The display substrate according to claim 7, wherein a duration of the signal of the reset signal line being a valid level signal is smaller than the duration of the second scan signal line being the valid level signal;

a duration of the signal of the first scan signal line being a valid level signal is less than the duration of the signal of the second scan signal line being a valid level signal; and the duration of the signal of the reset signal line being the valid level signal is less than or equal to the duration of the signal of the first scan signal line being the valid level signal.

9. The display substrate according to claim 6, wherein the signals of the reset signal line and the first scan signal line are invalid level signals at the second stage.

10. The display substrate according to claim 6, wherein the signals of the reset signal line and the first scan signal line are invalid level signals from a second third stage to a Nth third stage, N is greater than or equal to 2, N=M/K, where M is a reference frequency of the display substrate, K is the refresh rate of the display substrate in the first drive mode, and the reference frequency is the refresh rate of the display substrate in the second drive mode or a preset refresh rate.

11. The display substrate according to claim 6, wherein the second stage comprises a first refresh sub-stage;

the signal of the first scan signal line is an invalid level signal in the second stage; and the signal of the reset signal line is a valid level signal in the first refresh sub-stage and an invalid level signal in a third time period, wherein the third time period is a time period except the first refresh sub-stage in the second stage.

12. The display substrate according to claim 11, wherein any third stage from a second third stage to a Nth third stage comprises a third maintain sub-stage;

the signal of the first scan signal line is an invalid level signal from the second third stage to the Nth third stage; and the signal of the reset signal line is a valid level signal at the third maintain sub-stage in any third stage from the second third stage to the Nth third stage, and is an invalid level signal in a fourth time period, the fourth time period is a time period except the third maintain sub-stage in any third stage from the second third stage to the Nth third stage.

13. The display substrate according to claim 12, wherein a frequency at which the signal of the reset signal line is a valid level signal is equal to a frequency at which the signal of the light emitting signal line is an invalid level signal.

14. The display substrate according to claim 6, wherein the second stage comprises a second refresh sub-stage;

the signal of the reset signal line is an invalid level signal in the second stage; and the signal of the first scan signal line is a valid level signal in the second refresh sub-stage and an invalid level signal in a fifth time period, wherein the fifth time period is a time period except the second refresh sub-stage in the second stage.

15. The display substrate according to claim 14, wherein any third stage of a second third stage to a Nth third stage comprises a fourth maintain sub-stage;

the signal of the reset signal line is an invalid level signal from the second third stage to the Nth third stage; and the signal of the first scan signal line is a valid level signal at the fourth maintain sub-stage in any third stage from the second third stage to the Nth third stage, and is an invalid level signal in a sixth time period, wherein the sixth tie period is a time period except the fourth maintain sub-stage in any third stage from the second third stage to the Nth third stage.

16. The display substrate according to claim 15, wherein a frequency at which the signal of the first scan signal line is a valid level signal is equal to a frequency at which the signal of the light emitting signal line is an invalid level signal.

17. The display substrate according to claim 6, wherein the second stage comprises a first refresh sub-stage and a third refresh sub-stage, a sum of durations of the first refresh sub-stage and the third refresh sub-stage is less than the duration of the second stage;

the signal of the reset signal line is a valid level signal in the first refresh sub-stage and an invalid level signal in a third time period, wherein the third time period is a time period except the first refresh sub-stage in the second stage; and the signal of the first scan signal line is a valid level signal in the third refresh sub-stage and an invalid level signal in a seventh time period, wherein the seventh time period is a time period except a second refresh sub-stage in the second stage.

18. The display substrate according to claim 17, wherein any third stage of a second third stage to a Nth third stage comprises a third maintain sub-stage and a fifth maintain sub-stage, a sum of durations of the third maintain sub-stage and the fifth maintain sub-stage is less than the duration of the third stage;

a signal of the reset signal line is a valid level signal at the third maintain sub-stage of the second third stage to the Nth third stage, and is an invalid level signal in a fourth time period, wherein the fourth time period is a time period except the third maintain sub-stage in any third stage from the second third stage to the Nth third stage; and a signal of the first scan signal line is a valid level signal at the fifth maintain sub-stage of any third stage from the second third stage to the Nth third stage, and is an invalid level signal in an eighth time period, wherein the eighth time period is a time period except the fifth maintain sub-stage of any third stage from the second third stage to the Nth third stage.

19. A display apparatus, comprising: a display substrate, wherein drive modes for the display substrate comprise: a first drive mode and a second drive mode, wherein a refresh rate of the display substrate in the first drive mode is less than a refresh rate of the display substrate in the second drive mode, wherein the display substrate is configured to display a plurality of display frames, wherein in the first drive mode, the display frames comprise: a refresh frame and at least one maintain frame; wherein the display substrate comprises pixel circuits arranged in an array, a data signal line and a first initial signal line; and wherein the data signal line provides a first data signal in the maintain frame, a voltage value of the first data signal is constant, and the first initial signal line provides a first initial signal in the refresh frame and the maintain frame, wherein the first initial signal is an Alternating Current (AC) signal; or the data signal line provides a first data signal in the maintain frame, a voltage value of the first data signal is constant, wherein the data signal line provides a second data signal during a partial time period of the refresh frame; and the voltage value of the first data signal is greater than or equal to a voltage value of the second data signal.

* * * * *